United States Patent
Wachtel

(10) Patent No.: US 11,313,392 B2
(45) Date of Patent: Apr. 26, 2022

(54) APPARATUS, SYSTEM, AND METHOD FOR POSITIONING AND POWERING DEVICES

(71) Applicant: Michael E. Wachtel, Teaneck, NJ (US)

(72) Inventor: Michael E. Wachtel, Teaneck, NJ (US)

(*) Notice: Subject to any disclaimer, the term of this patent is extended or adjusted under 35 U.S.C. 154(b) by 356 days.

(21) Appl. No.: 16/729,334

(22) Filed: Dec. 28, 2019

(65) Prior Publication Data
US 2020/0208659 A1 Jul. 2, 2020

Related U.S. Application Data

(60) Provisional application No. 62/786,977, filed on Dec. 31, 2018.

(51) Int. Cl.
| | | |
|---|---|---|
| *H01M 10/44* | (2006.01) | |
| *H01M 10/46* | (2006.01) | |
| *F16B 2/12* | (2006.01) | |
| *A47G 23/02* | (2006.01) | |
| *F21V 21/14* | (2006.01) | |
| *H02J 7/00* | (2006.01) | |
| *H02J 7/35* | (2006.01) | |
| *A47B 19/08* | (2006.01) | |

(52) U.S. Cl.
CPC ............... *F16B 2/12* (2013.01); *A47B 19/08* (2013.01); *A47G 23/02* (2013.01); *F21V 21/14* (2013.01); *H02J 7/0044* (2013.01); *H02J 7/35* (2013.01)

(58) Field of Classification Search
CPC .......... H02J 7/0042; H02J 7/0044; H02J 7/35; A47B 2200/0085; A47B 2200/0081; A47B 23/043; A47B 19/06; A47B 19/08; F21V 21/14

USPC ................. 320/101, 107, 109, 114, 115
See application file for complete search history.

(56) References Cited

U.S. PATENT DOCUMENTS

| | | | |
|---|---|---|---|
| 5,414,596 A | 5/1995 | Eaton | |
| 5,474,272 A | 12/1995 | Thompson | |
| 5,584,715 A * | 12/1996 | Ehrenfels | ............... B60L 53/65 |
| | | | 439/222 |
| 7,861,985 B2 | 1/2011 | Galvin | |
| 9,364,081 B1 | 6/2016 | Haymond | |
| 9,385,351 B2 | 7/2016 | Workman | |
| D767,556 S | 9/2016 | Lee | |
| 9,438,052 B1 | 9/2016 | Cole | |
| 2007/0138225 A1 | 6/2007 | Duchesne | |
| 2009/0128090 A1 | 5/2009 | Bi | |
| 2016/0355093 A1 * | 12/2016 | Konet | ................... H02J 7/0042 |
| 2019/0346122 A1 * | 11/2019 | Proeber | ................. F21V 17/007 |

* cited by examiner

*Primary Examiner* — Edward Tso
(74) *Attorney, Agent, or Firm* — Stephen L. Keefe LLC

(57) ABSTRACT

An apparatus is disclosed. The apparatus has an adjustable attachment assembly including at least one movable member, a body assembly that is movably attached to the adjustable attachment assembly, a movable assembly that is movably attached to the body assembly, a power storage disposed in at least one of the movable assembly and the body assembly, and a device stand assembly movably attached to the movable assembly. The adjustable attachment assembly is movable in a first direction relative to the body assembly. The movable assembly is movable in a second direction relative to the body assembly that is different from the first direction.

20 Claims, 17 Drawing Sheets

APPARATUS, SYSTEM, AND METHOD FOR POSITIONING AND POWERING DEVICES

RELATED APPLICATIONS

This application claims the benefit of U.S. Provisional Patent Application No. 62/786,977 filed on Dec. 31, 2018, which is hereby incorporated by reference in its entirety.

TECHNICAL FIELD

The present disclosure generally relates to a positioning and powering apparatus, system, and method, and more particularly to an apparatus, system, and method for positioning and powering devices.

BACKGROUND

Consumers typically carry multiple electronic devices when travelling and moving between locations and often are unable to efficiently charge these devices using conventional portable battery systems. It is also difficult for users to position and view devices in a hands-free manner. Conventional systems also typically involve cumbersome chargers such as awkward and non-ergonomic battery device chargers.

Conventional systems also lack the ability to keep user devices charged for relatively long periods of time. Such systems also typically take up significant space on flat surfaces such as tables or are difficult to use when there are no flat surfaces adjacent to a user.

The exemplary disclosed apparatus, system, and method of the present disclosure are directed to overcoming one or more of the shortcomings set forth above and/or other deficiencies in existing technology.

SUMMARY OF THE DISCLOSURE

In one exemplary aspect, the present disclosure is directed to an apparatus. The apparatus includes an adjustable attachment assembly including at least one movable member, a body assembly that is movably attached to the adjustable attachment assembly, a movable assembly that is movably attached to the body assembly, a power storage disposed in at least one of the movable assembly and the body assembly, and a device stand assembly movably attached to the movable assembly. The adjustable attachment assembly is movable in a first direction relative to the body assembly. The movable assembly is movable in a second direction relative to the body assembly that is different from the first direction.

In another aspect, the present disclosure is directed to a method. The method includes rotatably attaching a body assembly to an adjustable attachment assembly, rotatably attaching a movable assembly to the body assembly, removably attaching the adjustable attachment assembly to an object, movably attaching a device stand assembly to the movable assembly, rotating the body assembly, the movable assembly, and the device stand assembly about a first axis relative to the attachment assembly, rotating the movable assembly and the device stand assembly about a second axis relative to the body assembly, the second axis being unparallel to the first axis, and moving the device stand assembly relative to the movable assembly and the body assembly. The method also includes disposing a user device on the device stand assembly, and charging the user device using a power storage disposed in at least one of the movable assembly and the body assembly.

DETAILED DESCRIPTION AND INDUSTRIAL APPLICABILITY

Figure 1:
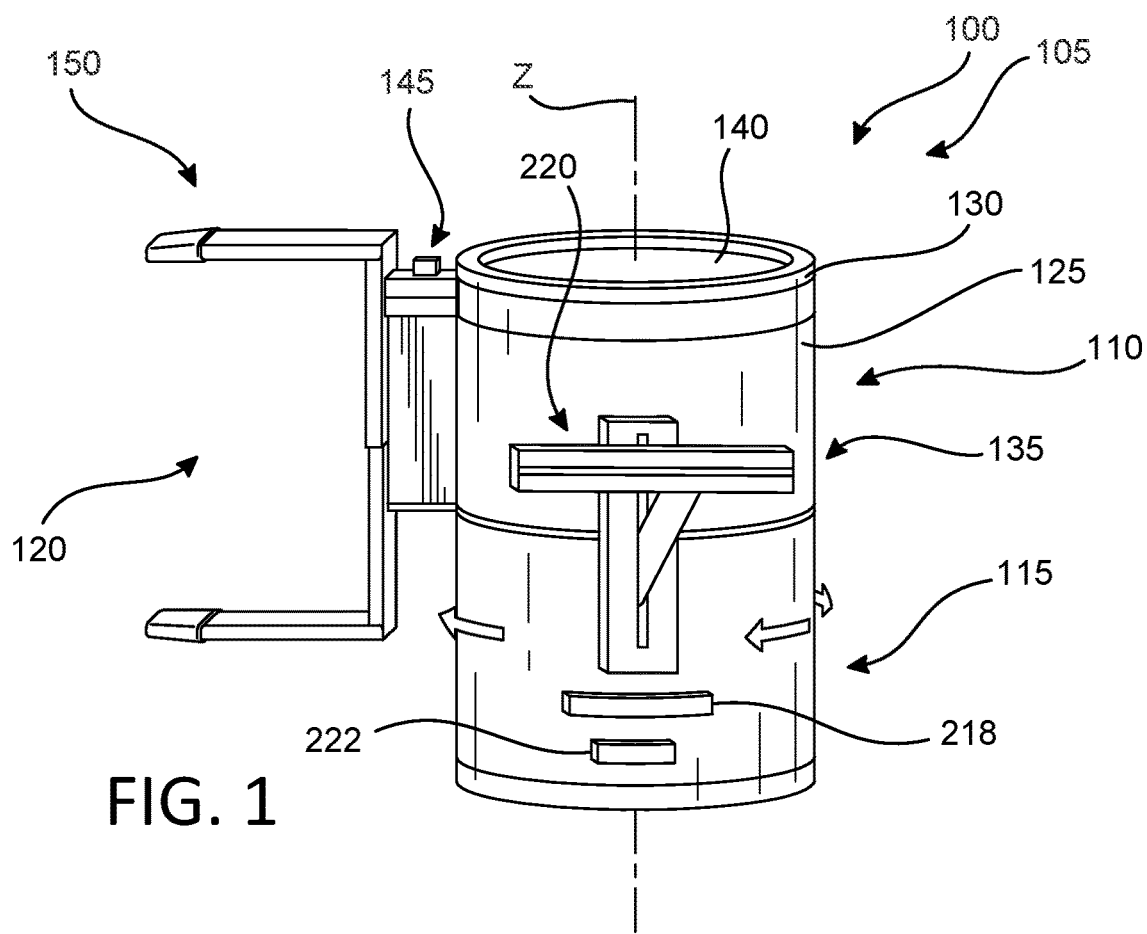
FIG. 1 is a side view of an exemplary apparatus in accordance with an embodiment of the present invention.

FIGS. 1-8 illustrate an exemplary disclosed apparatus and system. System 100 may be a system for charging and/or positioning any suitable devices (e.g., user devices) such as electronic devices. In at least some exemplary embodiments, system 100 may charge and/or maintain a desired position of any suitable devices. System 100 may include an assembly 105 that may be attached (e.g., anchored) to any suitable object for example as described herein and may charge and/or position any desired device. For example as described herein, assembly 105 may provide for hands-free use of positioned devices as the devices are charged and may provide for additional desired features such as providing placement and/or attachment of accessories (e.g., cups, electrical components, mechanical and/or electromechanical components, and/or any other desired accessories).

Assembly 105 may include a body assembly 110, a movable assembly 115, and an attachment assembly 120. Movable assembly 115 may be movably attached to body assembly 110. Attachment assembly 120 may be attached to body assembly 110 and may removably attach assembly 105 to desired objects and/or at desired locations.

Assembly 105 as well as other exemplary disclosed components of system 100 may be constructed from any suitable variety of durable materials. For example, some or most of the components of assembly 105 and/or other components of system 100 may be formed from plastic or a plastic composite material. Also for example, some or most of the components of assembly 105 and/or other components of system 100 may be formed from metal or metal alloy. For example, some or most of the components of assembly 105 and/or other components of system 100 may be formed from plastic, plastic composite, metal, and/or metal alloy. For example, some or most of the components of assembly 105 and/or other components of system 100 may be formed from a variety of materials disclosed herein. For example, some or most of the components of assembly 105 and/or other components of system 100 may be formed partially or substantially entirely from plastic, plastic composite, metal, and/or metal alloy materials. For example, some or most of the components of assembly 105 and/or other components of system 100 may be formed from plastic or metal structural members.

Some or most of the components of assembly 105 and/or other components of system 100 may be fabricated using any suitable technique such as any suitable technique for assembly (e.g., molding, fastening, and/or any other suitable assembly techniques), three-dimensional printing, and/or any other desired fabrication techniques. Any suitable methods and corresponding materials to form components may be used. According to at least some exemplary embodiments of the present invention, some or most of the components of assembly 105 and/or other components of system 100 may be formed by 3D printing (also known as "additive" manufacturing), CNC machined parts (also known as "subtractive" manufacturing), and injection molding. Thermoplastic and thermosetting polymers, resins and elastomers, and any other suitable materials may be used. Many plastics, polymers and resins are known and available and can be selected and mixed depending on desired strength and flexibility.

Components of assembly 105 (e.g., body assembly 110 and/or movable assembly 115) and/or other components of system 100 may have any desired polygonal shape such as a cylindrical or elliptical shape. For example, components of assembly 105 (e.g., body assembly 110 and/or movable assembly 115) may include portions having any desired shape such as, for example, a tube shape, a square prism, triangular prism, a hexagonal prism, an octagonal prism, a polygonal prism, a flared shape and/or any other desired shape.

Body assembly 110 may be any suitable housing that allows for attachment to attachment assembly 120 and movement of movable assembly 115. For example, body assembly 110 may be a housing including a cavity configured to receive movable assembly 115. In at least some exemplary embodiments, body assembly 110 may be a hollow cylindrically-shaped (e.g., or elliptical or any other desired shape) that receives a portion of movable assembly 115. Movable assembly 115 may be movably (e.g., rotatably) attached to body assembly 110. For example, a portion of an exterior surface of movable assembly 115 may be configured to be received within a portion of an interior surface of body assembly 110 so that movable assembly 115 may rotate freely relative to body assembly 110. For example, corresponding protrusions, recesses, slots, and/or grooves may be disposed on corresponding surfaces of body assembly 110 and movable assembly 115 so that movable assembly 115 may be movably attached to body assembly 110. Movable assembly 115 may thereby move (e.g., rotate) relative to body assembly 110 while remaining attached to body assembly 110. For example, movable assembly 115 may freely rotate about an axis Z. In at least some exemplary embodiments, movable assembly 115 may freely rotate between 0 and 360 degrees relative to body assembly 110 about axis Z (e.g., or any other suitable range or rotation for example between about 0 degrees and about 270 degrees).

In at least some exemplary embodiments, body assembly 110 may include a member 125 (e.g., a hollow cylinder) that may have a closed upper portion 130 and an open lower portion 135 configured to receive a portion of movable assembly 115 as described herein. Closed upper portion 130 may include a recess 140. For example, closed upper portion 130 may be a structural member including recess 140 that may be configured to removably receive a container as described below. In at least some exemplary embodiments, closed upper portion 130 may remain stationary relative to body assembly 110 so that closed upper portion 130 and a container disposed in recess 140 of closed upper portion 130 do not move when movable assembly 115 moves. Closed upper portion 130 (e.g., a cup holder portion) may thereby support a container in a stationary manner during a movement of movable assembly 115. Body assembly 110 may thereby serve as a cup holder that supports containers in a stationary position relative to fastened body assembly 110 and attachment assembly 120, while allowing a free rotation of movable assembly 115 as described herein.

Figure 2:
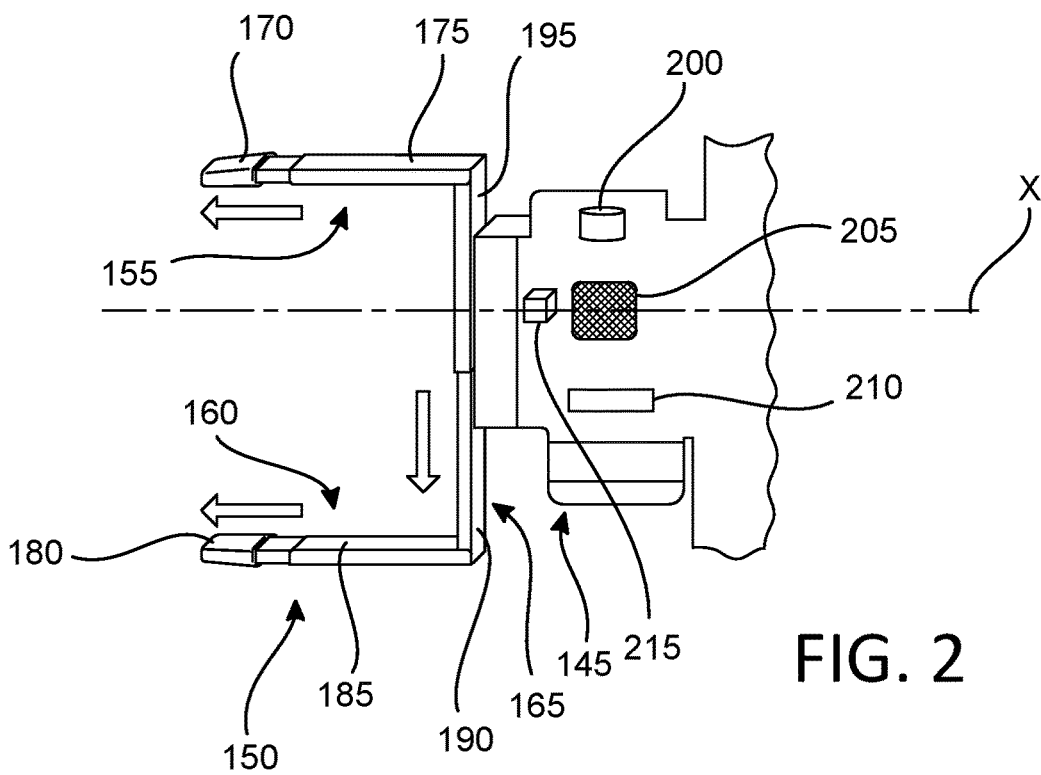
FIG. 2 is a top view of the exemplary apparatus in accordance with an embodiment of the present invention.

Attachment assembly 120 may be an anchoring mechanism (e.g., anchor) that attaches assembly 105 to a desired object or surface as described for example herein. As illustrated in FIGS. 1 and 2, attachment assembly 120 may include a base assembly 145 and an anchor assembly 150. Also for example, base assembly 145 may be a portion of body assembly 110. Anchor assembly 150 may be movably (e.g., rotatably) attached to base assembly 145 as described for example herein. In at least some exemplary embodiments, base assembly 145 may be fixedly attached to body assembly 110. In other exemplary embodiments, base assembly 145 may be movably attached to body assembly 110. Anchor assembly 150 may also be removably attachable to base assembly 145 (e.g., via a release actuator similar to the exemplary disclosed release actuators as described for example herein) to allow for alternate anchor assemblies to be attached to assembly 105 as described for example herein.

Anchor assembly 150 may include a member 155, a member 160, and a member 165. Members 155, 160, and/or 165 may be selectively extendable and retractable structural members. For example as illustrated in FIG. 2, members 155 and 160 may be extension members that are attached to member 165. Member 155 may include an extension member 170 that is movably attached to a base member 175. For example, extension member 170 may be supported by base member 175 and movably adjusted along a length of base member 175 to a desired length. Extension member 170 may be locked at desired extension lengths along base member 175 as desired (e.g., by a retractable locking protrusion, friction-fit locking, compressible locking mechanism, or any other suitable mechanism for selectively locking extension member 170 at a desired length or position relative to base member 175). Member 160 may include an extension member 180 and a base member 185 that may be similar to extension member 170 and base member 175. Member 165 may include an extension member 190 and a base member 195 that may be similar to extension member 170 and base member 175. Anchor assembly 150 may thereby be selectively adjustable to fit onto a desired object or surface based on selective extension and/or retraction of each of members 155, 160, and 165. For example, extension members 170, 180, and 190 may be telescopic members that selectively telescopically extend and retract from respective base members 175, 185, and 195 to provide a desired grip to a desired object or surface.

Members 155 and 160 may also be selectively folded inward to be parallel to member 165 (e.g., folded inward) to provide a compact structure for travel. For example, members 155 and 160 may be unlocked and folded inward based on rotatable members (e.g., pins or other structural devices) disposed at respective attachments to member 165.

Anchor assembly 150 may also be movably attachable to base member 145. For example, anchor assembly 150 may be rotatably attached to base member 145 and may be rotated relative to base member 145 (e.g., based on any suitable connection such as a rotatable pin, rotatable bearing, or any other suitable connection including components such as bearings, grooves, protrusions, elongated slots, or any other suitable component). For example as illustrated in FIG. 1 (e.g., side view such as a left view) and FIG. 2 (e.g., top view), anchor assembly 150 may be rotated relative to base assembly 145 and body assembly 110 about an axis X that may be different from or unparallel to axis Z about which movable assembly 115 may be rotated relative to body assembly 110. For example, anchor assembly 150 may be rotated relative to base assembly 145 and body assembly 110 (e.g., or base assembly 145 and body assembly 110 may be rotated relative to anchor assembly 150) about axis X that may be perpendicular to axis Z about which movable assembly 115 may be rotated relative to body assembly 110.

Base assembly 145 may also include a release actuator 200 (e.g., a first release actuator such as an anchor release button) that may control members 155, 160, and 165 to be selectively attached to a desired object or surface. For example when release actuator 200 is depressed (e.g., by a user), members 155, 160, and 165 may be adjustable by a user (e.g., extended and retracted). Also for example, when release actuator 200 is released when members 155, 160, and 165 are arranged in a desired anchoring position, members 155, 160, and 165 may ratchet shut (e.g., with pressure) to press against surfaces of an object. For example, release actuator 200 may selectively control actuation of internal members disposed within members 155, 160, and 165 (e.g., compression members such as springs, elastomer components, fasteners, and other suitable actuating components) to allow members 155, 160, and 165 to be selectively adjusted and tightened into a desired anchor position. Release actuator 200 may also selectively allow members 155 and 165 to be folded inward as described above (e.g., to make assembly 105 more compact) for example when release actuator 200 is pressed inward as described above.

Base assembly 145 may also include an aperture 205 (e.g., an attachment slot) to which an assembly (e.g., an accessory) may be removably attached as described for example below. Base assembly 145 may also include an aperture 210 (e.g., an attachment slot) to which an assembly (e.g., an accessory) may be removably attached as described for example below.

Base assembly 145 may also include a release actuator 215 (e.g., a second release actuator) that may be generally similar to release actuator 200. Release actuator 215 may be actuated to selectively control (e.g., to lock and unlock) a rotation of anchor assembly 150 relative to base assembly 145 about axis X.

As illustrated in FIG. 1, movable assembly 115 (e.g., or other suitable components of system 100 such as body assembly 110) may include a movable member 218. Movable member 218 may be any suitable member for storing a power cord such as a "pop-out" cord holder that may allow users to wrap a cord of the device that he or she is powering using system 100 to assembly 105 (e.g., to have less free cordage while the device being charged is disposed on the exemplary disclosed device stand described below). Movable assembly 115 (e.g., or other suitable components of system 100 such as body assembly 110) may also include a power outlet 222 that may be used to charge the device that may be disposed (e.g., mounted) on the exemplary disclosed device stand described below.

Figure 3:
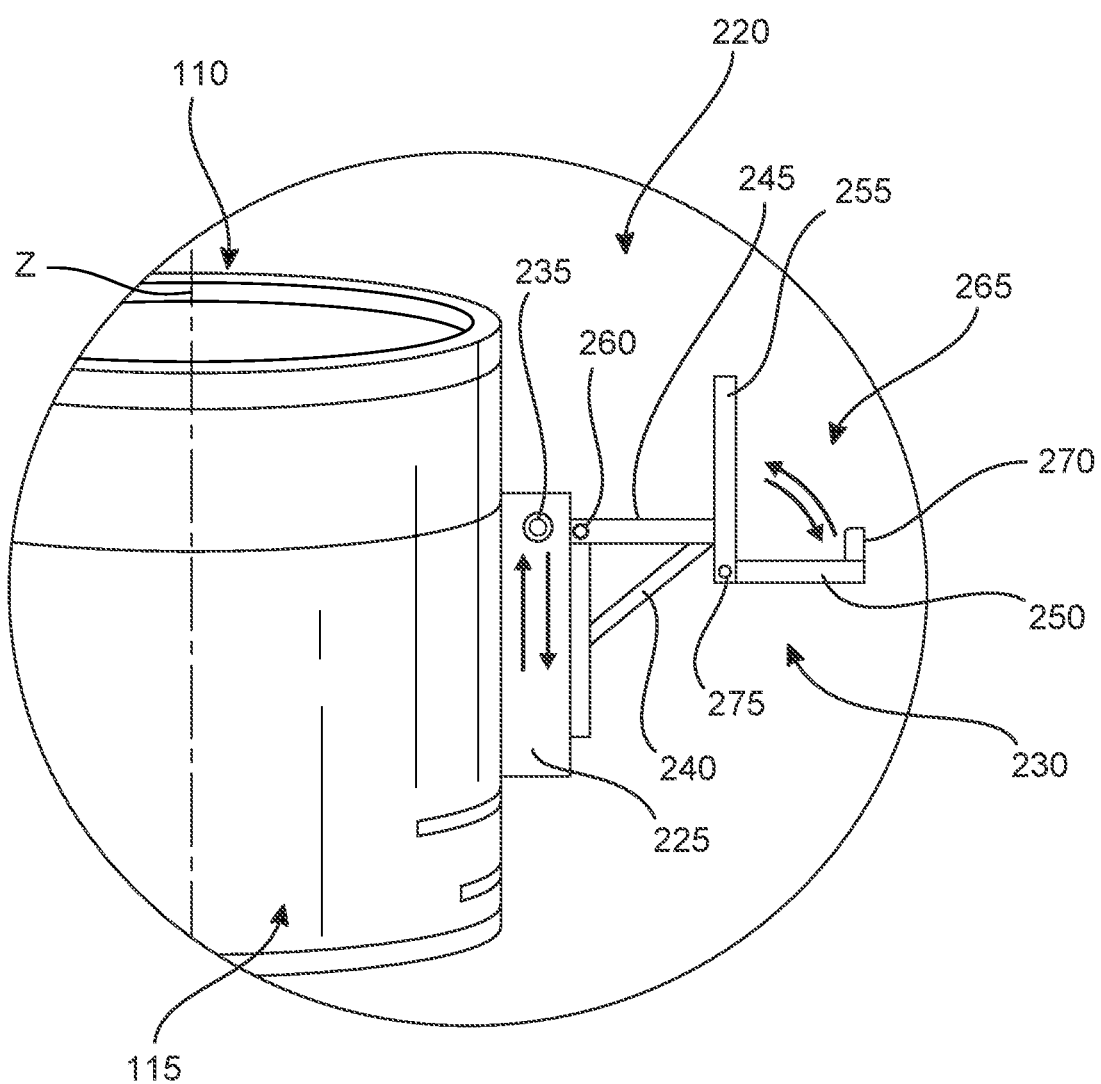
FIG. 3 is a side view of the exemplary apparatus in accordance with an embodiment of the present invention.

As illustrated in FIGS. 1 and 3, movable assembly 115 may also include a device stand assembly 220. Device stand assembly 220 may include a base member 225 that may be attached to movable assembly 115. For example, base member 225 may attach device stand assembly 220 to movable assembly 115 so that device stand assembly 220 may rotate with movable assembly 115 as movable assembly 115 rotates relative to body assembly 110 about axis Z.

Base member 225 may be movably attached to movable assembly 115 in a direction parallel to axis Z. For example, base member 225 may move up and down relative to movable assembly 115 as illustrated in FIG. 3 (e.g., via corresponding protrusions, apertures, slots, and/or any other suitable portions). For example, base member 225 may include a release actuator 235 (e.g., a vertical movement release actuator) that may selectively allow a movement of device stand assembly 220 up and down relative to movable assembly 115. Release actuator 235 may include components and operate generally similarly to release actuators 200 and 215 to selectively lock device stand assembly 220 at a desired vertical position (e.g., at a desired height) relative to movable assembly 115.

Device stand assembly 220 may also include a foldable assembly 230 that may be movably attached to movable assembly 115. Foldable assembly 230 may include collapsible members 240, 245, 250, and 255 that may be selectively extended to the position shown in FIG. 3 and collapsed to a stowed position against movable assembly 115 (e.g., compact for storage or transport of assembly 105) based on selective operation of a release actuator 260 (e.g., that may include similar components and operate similarly to release actuators 200, 215, and 235). Foldable assembly 230 may thereby be selectively expanded and collapsed based on a user operation of release actuator 260.

Members 250 and 255 may form a device stand 265 for holding a user device for example as described herein. Member 250 may include a protrusion 270 (e.g., a lip) that may help secure a user device on device stand 265. Members 250 and 255 may also include fasteners (e.g., clips, magnets, adhesive strips, hook and loop fasteners, and/or any other suitable fastener) for attaching a user device to device stand 265. Device stand 265 may also include a release actuator 275 (e.g., a tilt release actuator) that may selectively control a rotation of device stand 265. Release actuator 275 may include similar components and operate similarly to release actuators 200, 215, 235, and 260, and may selectively lock device stand 265 at a desired angle relative to movable assembly 115 as illustrated in FIG. 3 (e.g., tilt upward and downward). For example, device stand 265 may be rotated (e.g., tilted) toward and away from body assembly 110 and movable assembly 115 so that a user device positioned on device stand 265 is positioned as desired. Device stand assembly 220 may thereby be adjusted by a user based on an operation of release actuators 260 and 275 to position a user device in a desired position (e.g., a position that may be used comfortably, hands-free, by a user).

Figure 4A:
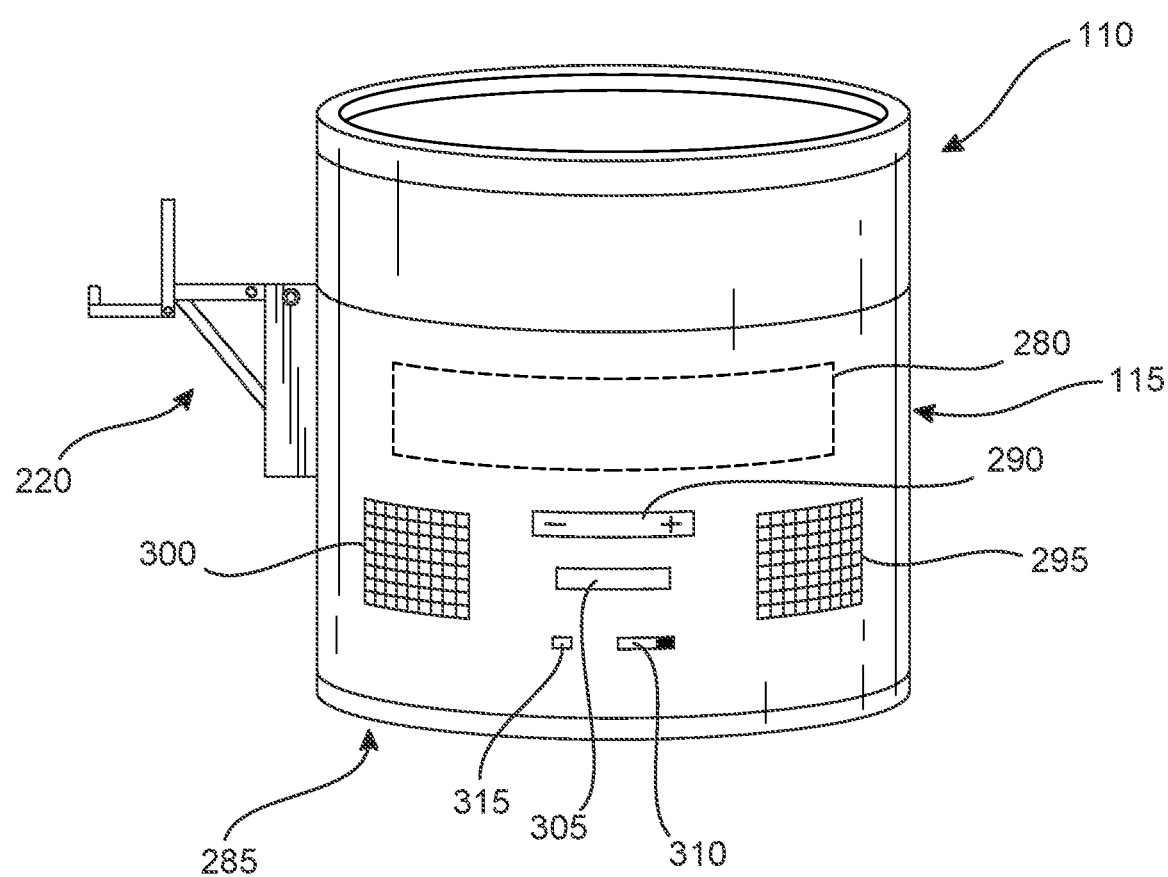
FIG. 4A is a front view of the exemplary apparatus in accordance with an embodiment of the present invention.

As illustrated in FIG. 4A (e.g., a side view such as a center view), movable assembly 115 may include a power storage 280. Power storage 280 may be disposed within (e.g., substantially completely within), partially within, or attached to movable assembly 115 (e.g., and/or body assembly 110 or any other suitable component of system 100). Power storage 280 may be any suitable battery such as a rechargeable battery. For example, power storage 280 may be a lithium ion battery, a nickel cadmium battery, a lead acid-based battery, a nickel-metal hydride battery, and/or any other suitable power storage that may be recharged and that may be used to provide charge to electronic devices. Also for example, some or all components of power storage 280 may be disposed in body assembly 110 and/or any other suitable component of system 100 (e.g., in addition to movable assembly 115). Power storage 280 may be an internal power source that may power user devices and other components of system 100 (e.g., internal speakers and other electrical components) as described for example herein.

As illustrated in FIG. 4A, movable assembly 115 may include an audio device 285. Audio device 285 may be built into movable assembly 115 and/or any other desired component of system 100 (e.g., body assembly 110). Audio device 285 may for example include a speakerphone (e.g., a speaker built into movable assembly 115). Audio device 285 may include an actuator 290 that may be a volume-level control for the speaker. Audio device 285 may include speakers 295 and 300 (e.g., right and left speakers). An actuator 305 may indicate and/or control a battery power level of audio device 285. An actuator 310 may be a battery on/off switch of audio device 285 and/or power storage 280. Actuator 315 may be an on/off switch of speakers of audio device 285 and/or a Bluetooth pairing button.

Figure 4B:
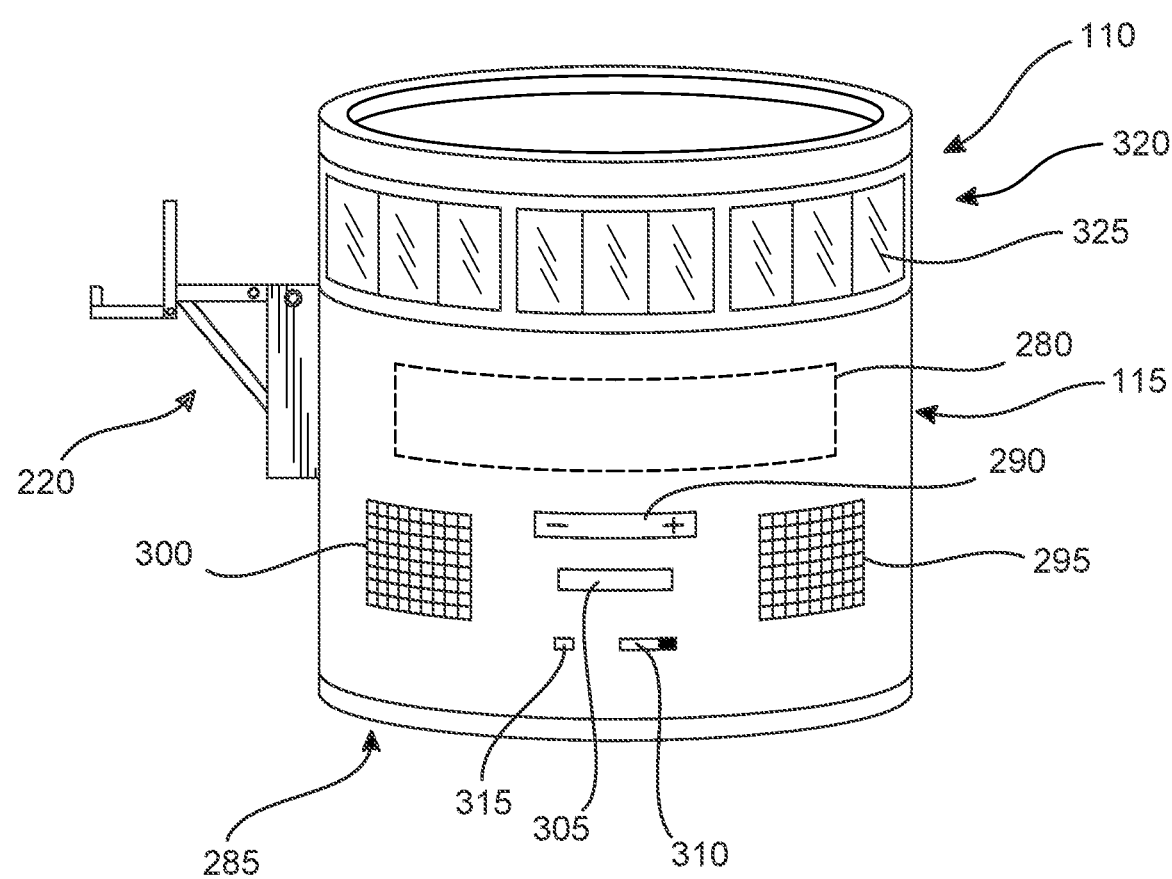
FIG. 4B is a front view of another exemplary apparatus in accordance with an embodiment of the present invention.

In at least some exemplary embodiments and as illustrated in FIG. 4B, movable assembly 115 may include a solar power assembly 320. Solar power assembly 320 may allow for power storage 280 to be recharged without connecting assembly 105 to a power grid component such as a wall socket. For example, body assembly 110 (e.g., and/or movable assembly 115 and/or any other suitable component of system 100) may include a plurality of solar panels 325 that may collect solar energy, which solar power assembly 320 may transfer to power storage 280 for charging power storage 280.

Figure 5:
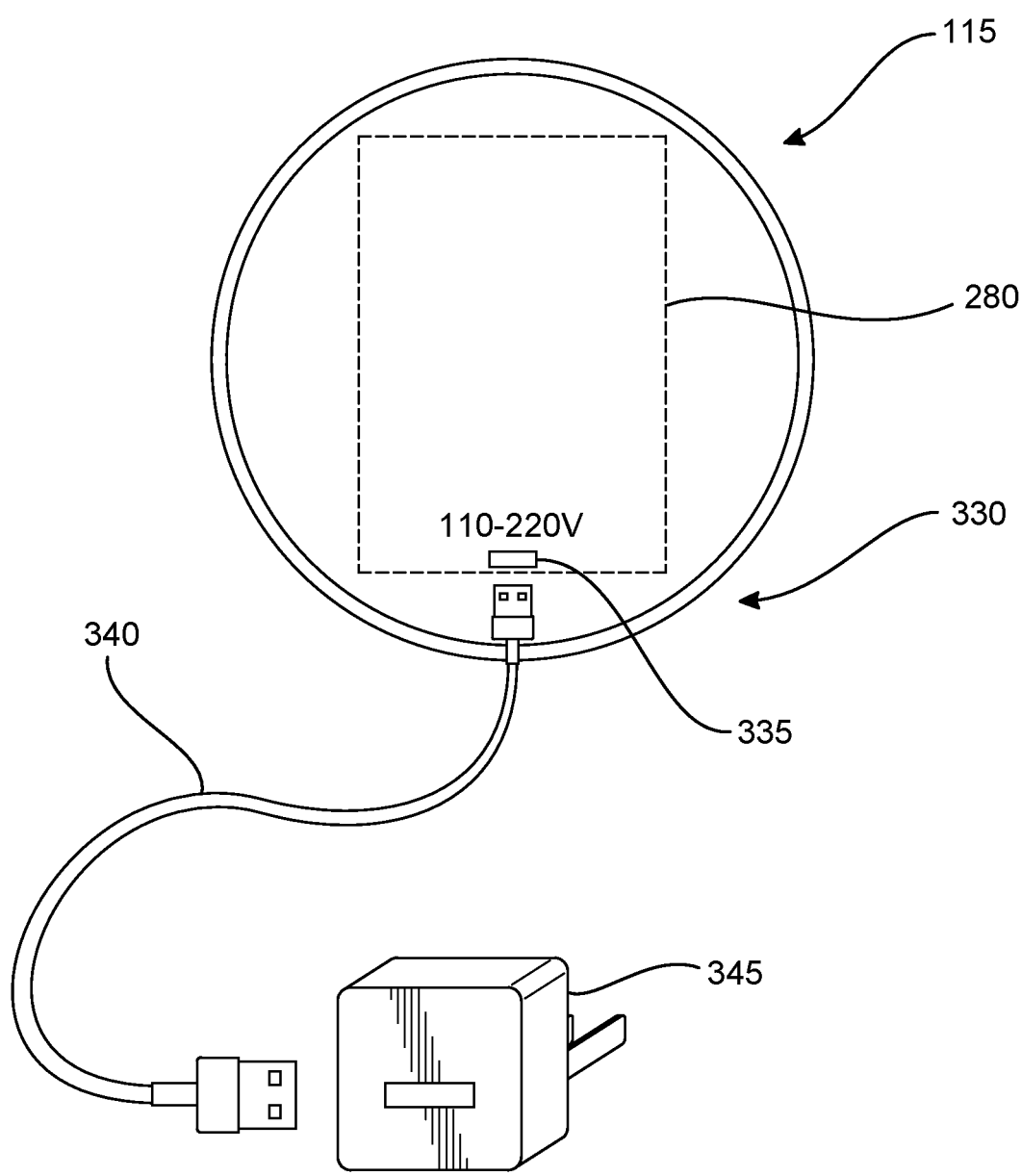
FIG. 5 is a bottom view of the exemplary apparatus in accordance with an embodiment of the present invention.

In at least some exemplary embodiments and as illustrated in FIG. 5 that illustrates a bottom view of movable assembly 115, movable assembly 115 may include an external charging device 330. External charging device 330 may include a port 335 (e.g., a micro-port) that may have an electrical volt capacity range of 110 to 220. External charging device 330 may also include a power connector 340 (e.g., a charging cable) and a power adapter 345 (e.g., an electrical power adapter) that may plug into a power source such as a wall socket to charge the power storage 280 and/or power components of system 100.

Figure 6:
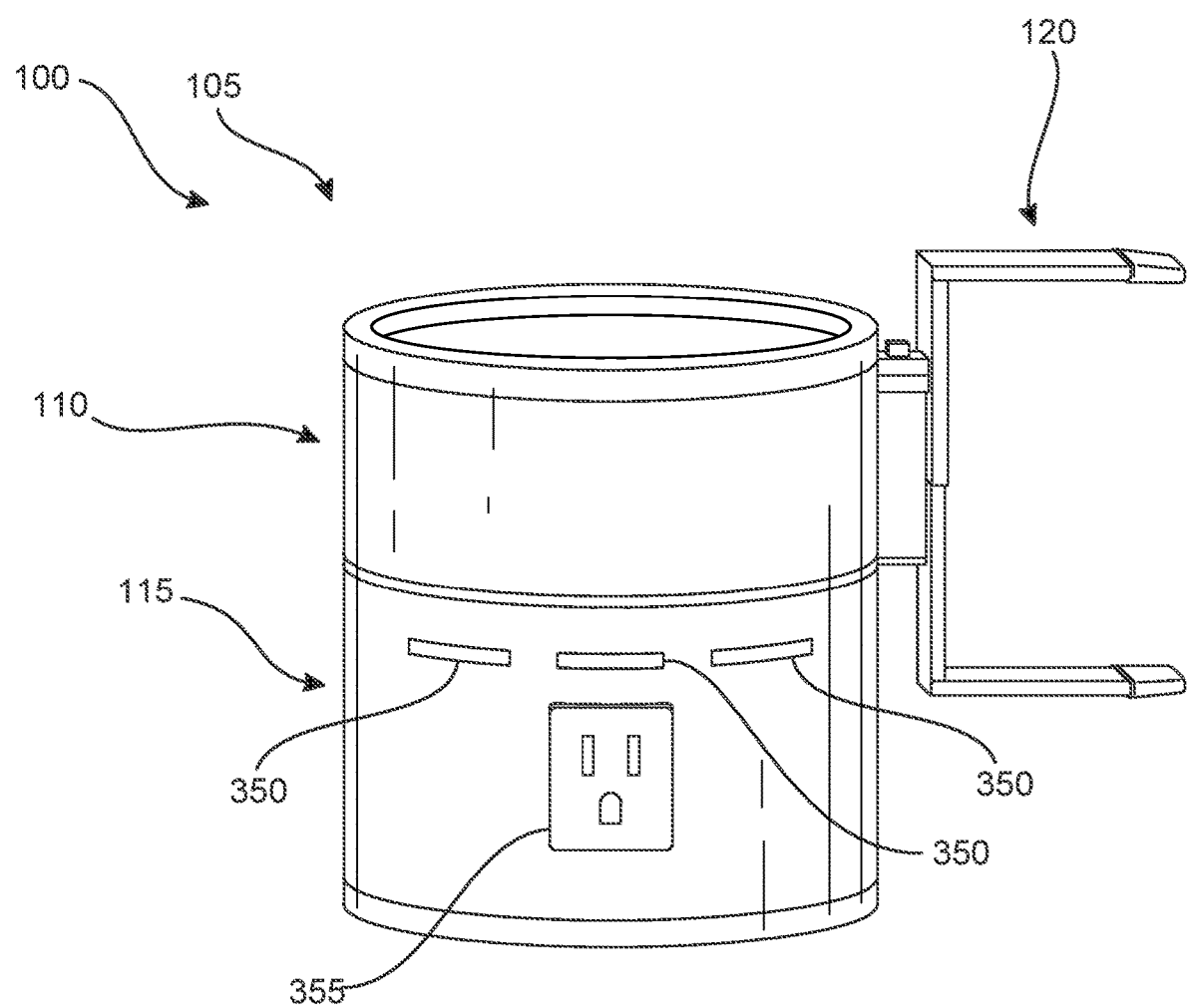
FIG. 6 is a side view of the exemplary apparatus in accordance with an embodiment of the present invention.

In at least some exemplary embodiments and as illustrated in FIG. 6 (e.g., a side view such as a right view), movable assembly 115 (e.g., or any other suitable component of system 100 such as body assembly 110) may include a plurality (e.g., two, three, or more) of power outlets 350 that may be any suitable power outlets for charging user devices (e.g., USB outlets). Any suitable type of power outlet may be provided such as, for example, power outlet 355 (e.g., an AC electrical outlet such as a two-pronged or three-pronged AC power socket).

Figure 7:
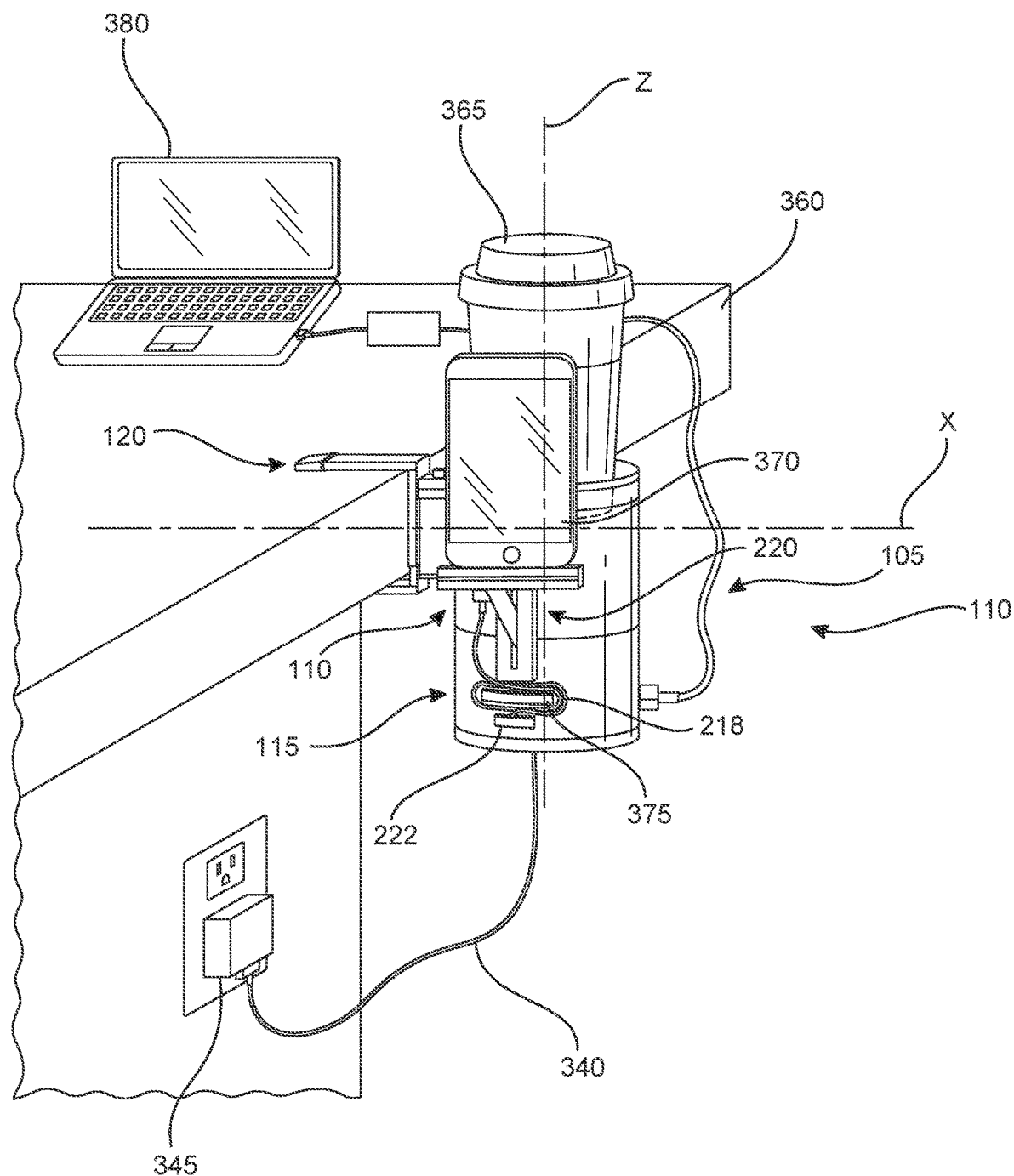
FIG. 7 is a perspective view of the exemplary apparatus in accordance with an embodiment of the present invention.

FIG. 7 illustrates an exemplary arrangement of system 100 during use. For example, assembly 105 may be attached to any suitable surface or object such as furniture (e.g., a table, chair, desk, lamp, or other furniture), a portion of a vehicle such as a car or airplane (e.g., a tray table), a structural member (e.g., a portion of a building), or any other suitable location. For example as illustrated in FIG. 7, assembly 105 may be attached to a table 360 (e.g., with attachment assembly 120 rotated to be oriented in a suitable position to be attached to the table).

As illustrated in FIG. 7, any suitable object 365 may be disposed in recess 140 and supported by upper portion 130 of body assembly 110. Object 365 may be any suitable object to be supported such as, for example, a beverage container (e.g., coffee cup), office supply object, food, and/or any other desired objects. Assembly 105 may similarly include pen holders, clips for holding objects and devices, and/or any other desired attachment devices.

As illustrated in FIG. 7, any suitable device 370 may be supported by device stand assembly 220. Device 370 may be a cellular phone (e.g., smartphone), tablet, any desired smart device, any electronic user device (e.g., health or exercise monitoring device), health device (e.g., hearing aid or blood sugar monitor), electronic toy, computing device, or any desired user device. As described for example above, a power cable 375 may be partially wrapped around movable member 218 and plugged into power outlet 222 (e.g., or any other power outlet of assembly 105 such as power outlet 350 or 355).

Also as illustrated in FIG. 7, assembly 105 may be connected to a power source via power connector 340 and power adapter 345 to charge power storage 280 (which may provide power to the exemplary disclosed user devices as described for example herein). Also for example, any desired device such as a device 380 that may be similar to device 370 may be connected to any desired power outlet (e.g., power outlet 222, 350, or 355) of assembly 105. For example, device 380 may be a computing device (e.g., laptop computer or tablet) that may be disposed on a flat surface (e.g., on a surface of table 360) nearby the user based on assembly 105 being attachable to table 360 to open up more work area on a surface of table 360. Any desired number of electronic devices may be simultaneously charged via an operation of system 100 based on the plurality of exemplary disclosed power outlets disposed on assembly 105.

Figure 8:
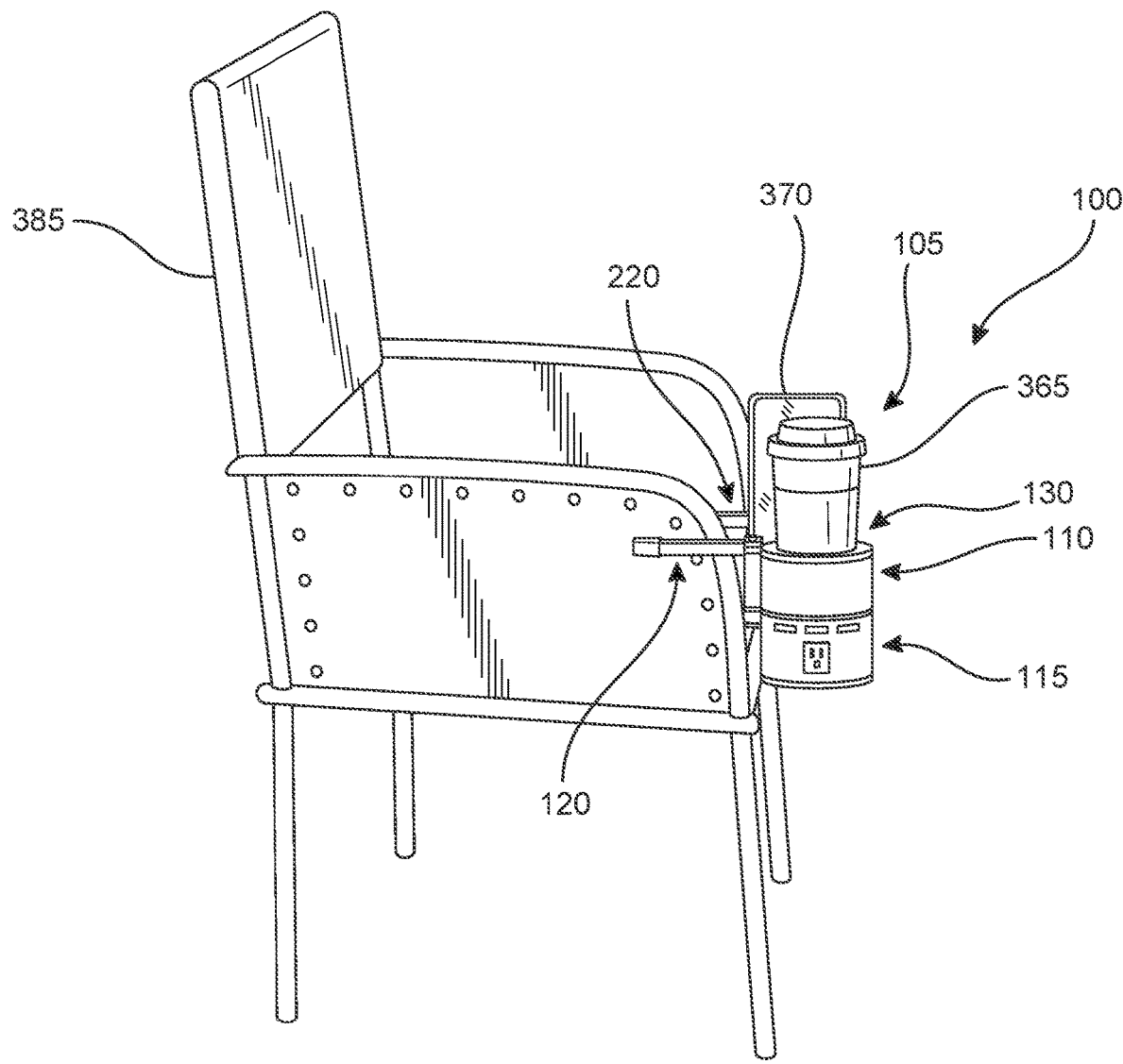
FIG. 8 is a perspective view of the exemplary apparatus in accordance with an embodiment of the present invention.

FIG. 8 illustrates an additional exemplary arrangement of system 100 during use. For example, assembly 105 may be attached to an object 385 such as a chair. For example as illustrated in FIG. 7, assembly 105 may be attached to object 385 (e.g., with attachment assembly 120 rotated to be oriented in a suitable position to be attached to object 385 that may be a chair). For example, assembly 105 may be mounted on an elbow of object 385 that may be a chair. Device 370 may be supported by device stand assembly 220 and object 365 may be supported by upper portion 130. System 100 may operate to charge power storage 280 and to charge exemplary disclosed devices similarly to as described above regarding FIG. 7.

Figure 9:
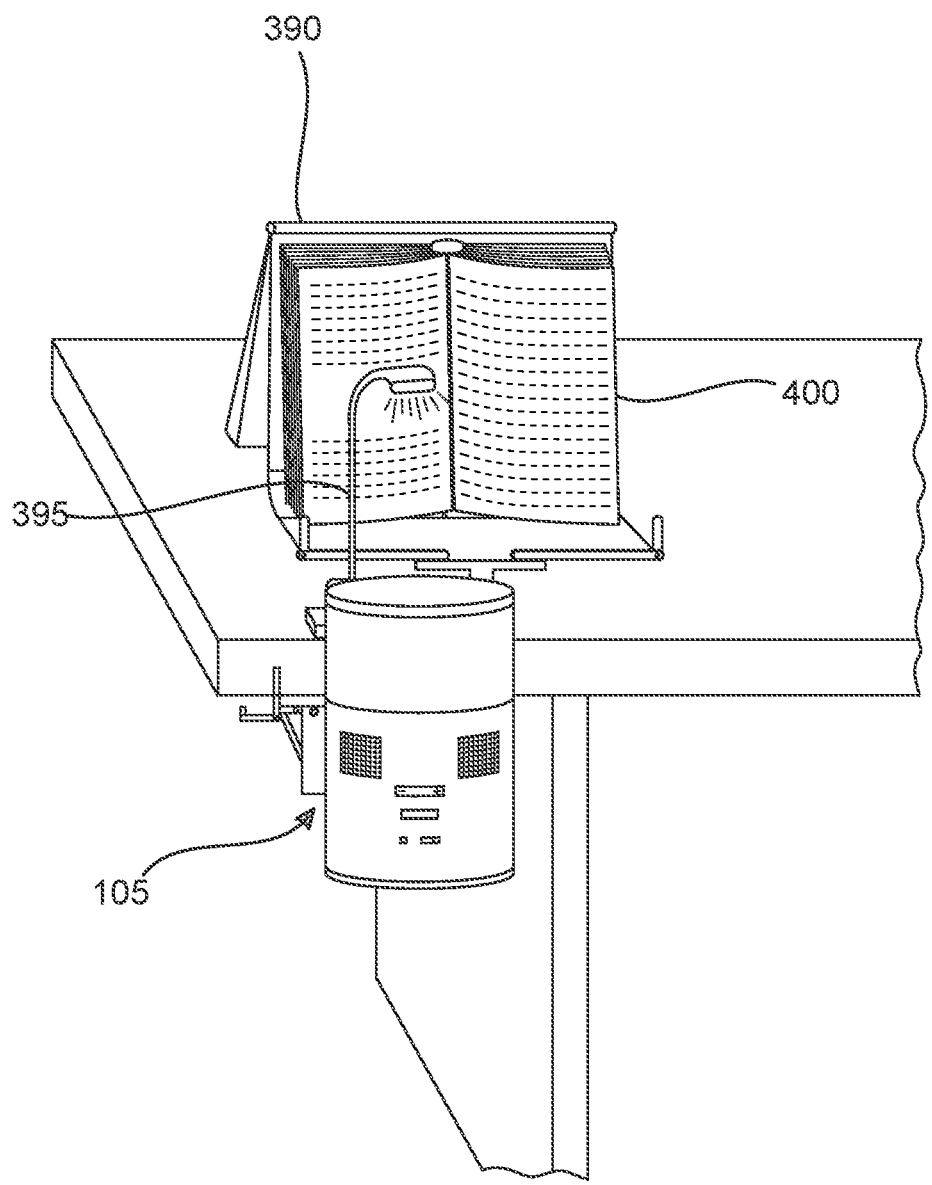
FIG. 9 is a perspective view of an exemplary system in accordance with an embodiment of the present invention.
Figure 10:
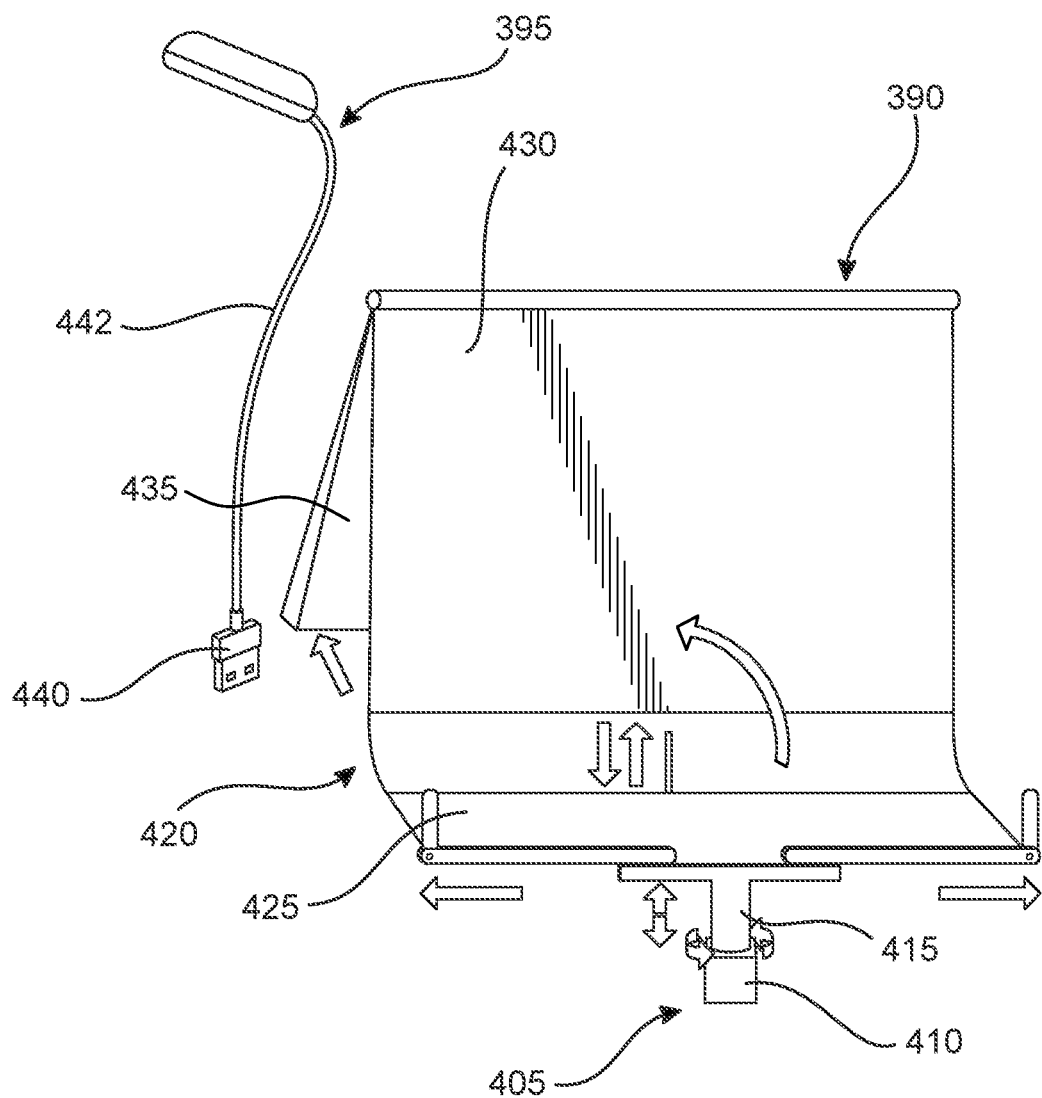
FIG. 10 is a perspective view of exemplary components of the exemplary system in accordance with an embodiment of the present invention.

FIGS. 9 and 10 illustrate exemplary components (e.g., accessories) of system 100 that may be removably attached to assembly 105. For example, a support assembly 390 and an accessory 395 may be removably attached to assembly 105.

As illustrated in FIGS. 9 and 10, support assembly 390 may be a support for supporting an object 400. Object 400 may be any desired object such as a book, binder, tablet, display device, paper, a notebook, or any other desired object. For example, support assembly 390 may be a book holder that may support object 400 that may be a book. Support assembly 390 may include a protruding assembly 405 that may include a base member 410 and a strut 415. Base member 410 may be removably received in aperture 205 of assembly 105, thereby supporting support assembly 390 on assembly 105. Strut 415 may be rotatably attached to base member 410 (e.g., or base member 410 may rotate within aperture 205), allowing support assembly 390 to be rotated relative to attachment assembly 120 (e.g., to base assembly 145 that may be attached to anchor assembly 150 and to body assembly 110). Support assembly 390 may include a superstructure 420 that may be rotated about an axis parallel to axis Z based on protruding assembly 405 being rotatably connected at aperture 205 of attachment assembly 120. For example, support assembly 390 may be a rotatable holder attachment such as a book holder attachment.

Superstructure 420 may include a base member 425 for supporting a bottom of object 400 and a back member 430 for supporting a back of object 400. A back end member 435 may be rotatably attached to back member 430 and may have an adjustable length that may telescope similarly to members 155, 160, and 165 (e.g., back member 430 may also be similarly telescopically adjusted). A back end member 435 may be adjusted (e.g., rotated and/or telescoped) as it is supported by a flat surface (e.g., table 360), which may adjust an angle of back member 430 that may be supported by back end member 435. An angle at which back member 430 is disposed may be thereby adjusted by a user as desired. Members 425, 430, and 435 may also be folded together based on rotatable attachments to collapse superstructure 420 (e.g., for stowing or transport) similarly to device stand assembly 220. Base member 425 (e.g., and back member 430) may include telescopic lateral members that may selectively increase and decrease a width of superstructure 420 as desired. For example, left and right ends of superstructure 420 may be selectively expanded and decreased in size to support objects 400 of varying sizes. Strut 415 and/or base member 425 may be selectively expanded or decreased in vertical length to position superstructure 420 at a desired height for use by a user.

Accessory 395 may include a base member 440 that may be removably attached to aperture 210 of assembly 105. In at least some exemplary embodiment, accessory 395 may be a lighting component such as a flex-light lighting device (e.g., having a flexible body 442 that may be adjusted to a desired position by a user). Base member 440 may include electrical components that may be electrically connected to electrical components disposed at aperture 210 (e.g., a USB or other electrically connector) so that accessory 395 may be powered by power storage 280. Accessory 395 may also be electrically attached to any other suitable outlet of assembly 105 such as power outlet 222, 350, or 355.

Figure 11A:
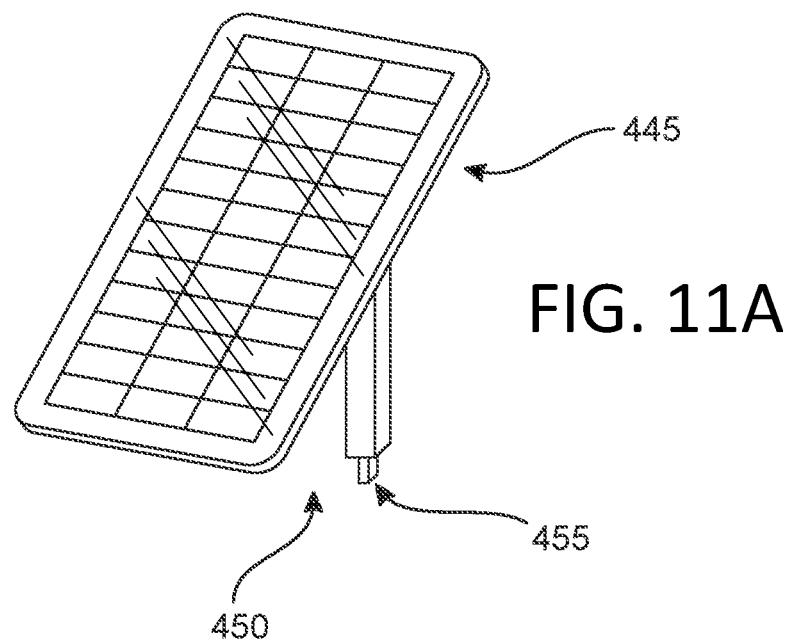
FIG. 11A is a perspective view of exemplary components of the exemplary system in accordance with an embodiment of the present invention.
Figure 11B:
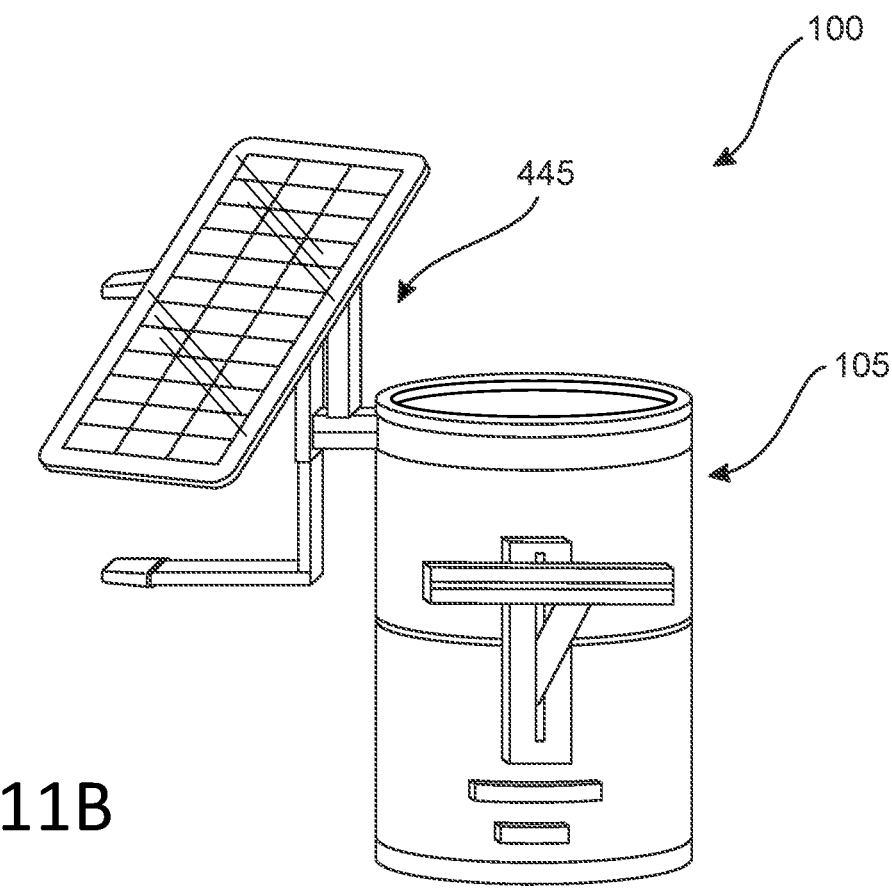
FIG. 11B is a perspective view of exemplary components of the exemplary system in accordance with an embodiment of the present invention.

FIGS. 11A and 11B illustrate an exemplary attachment that may be attached to assembly 105. An attachment device 445 may be a solar attachment device that may be removably attached to assembly 105. Attachment device 445 may be electrically connected to assembly 105 and may charge power storage 280. Attachment device 445 may include an adapter assembly 450 (e.g., an adapter piece assembly) that may fold inward for storage or transport and outward for attachment to assembly 105 and use. Attachment device 445 may include an electrical connector 455 that electrically connects attachment device 445 to assembly 105 for powering power storage 280.

Figure 12:
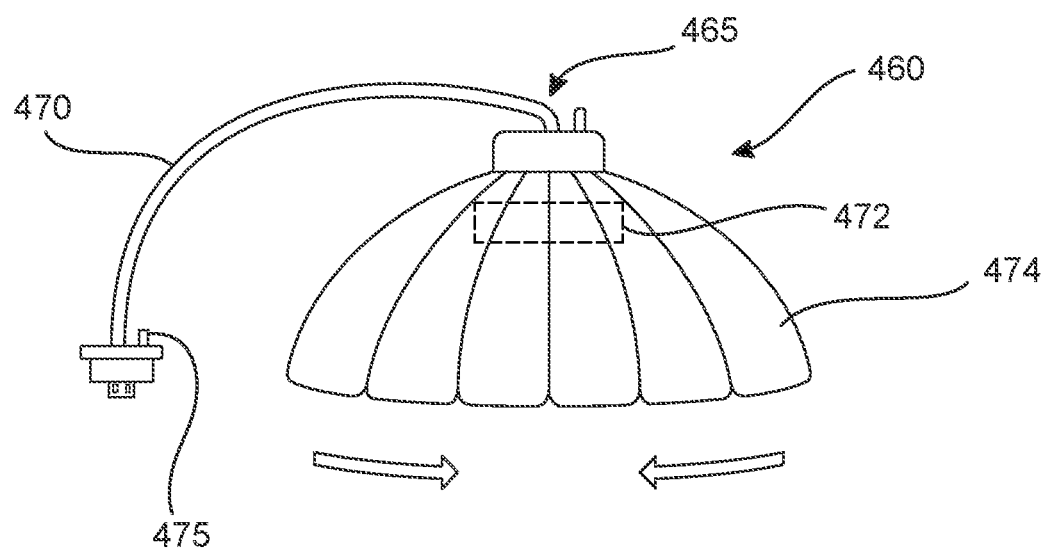
FIG. 12 is a perspective view of exemplary components of the exemplary system in accordance with an embodiment of the present invention.
Figure 13:
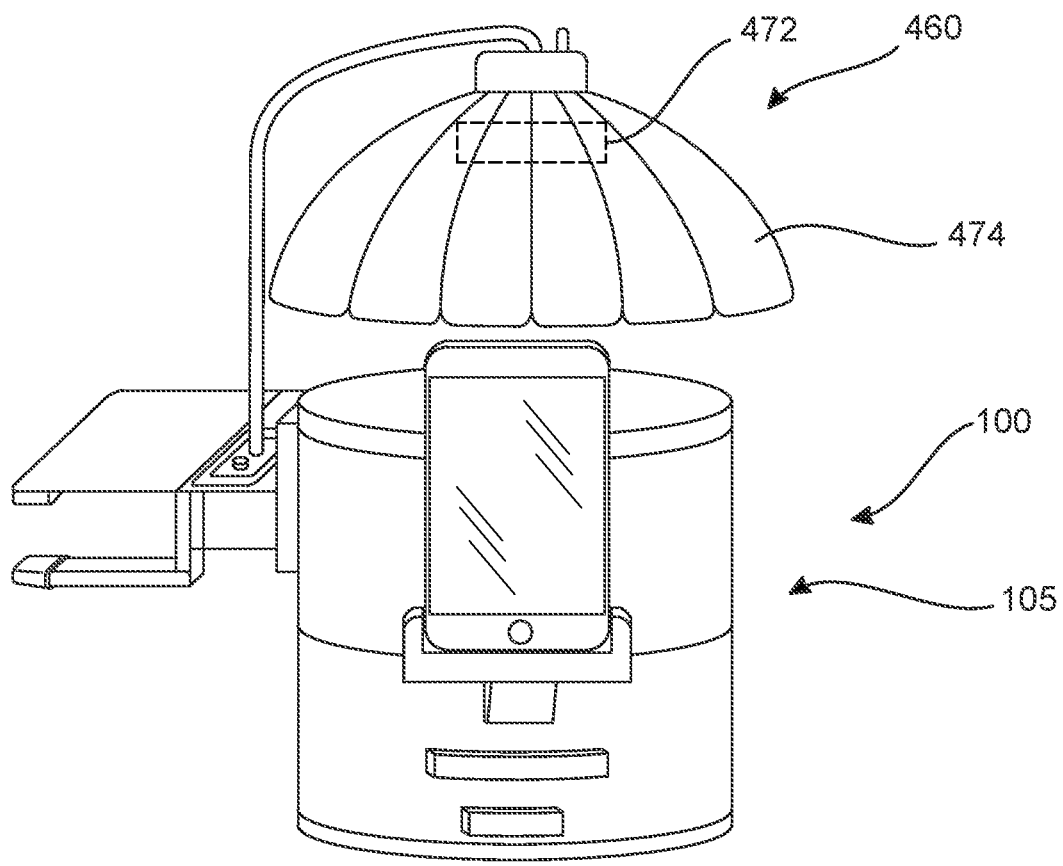
FIG. 13 is a perspective view of exemplary components of the exemplary system in accordance with an embodiment of the present invention.

FIGS. 12 and 13 illustrate another exemplary attachment that may be attached to assembly 105. An attachment device 460 may be a fan and/or umbrella attachment device that may include a fan 472 and/or umbrella 474 that may be removably attached to assembly 105. Fan 472 may be disposed partially or completely within umbrella 474. Attachment device 460 may include a release actuator 465 that may release expandable and collapsible umbrella 474 and/or fan 472 as illustrated in FIGS. 12 and 13 when actuated. Attachment device 460 may also include a structural member 470 (e.g., a flexi-neck support) and an actuator 475 that may turn fan 472 disposed within umbrella 474 on and off.

As illustrated in FIGS. 14-18, system 100 may include various alternate attachment assemblies that may removably replace attachment assembly 120 as desired. For example, a user may selectively detach removably attachable attachment assembly 120 from assembly 105 and replace it with the exemplary disclosed removably attachable attachment assemblies illustrated in FIGS. 14-18.

Figure 14:
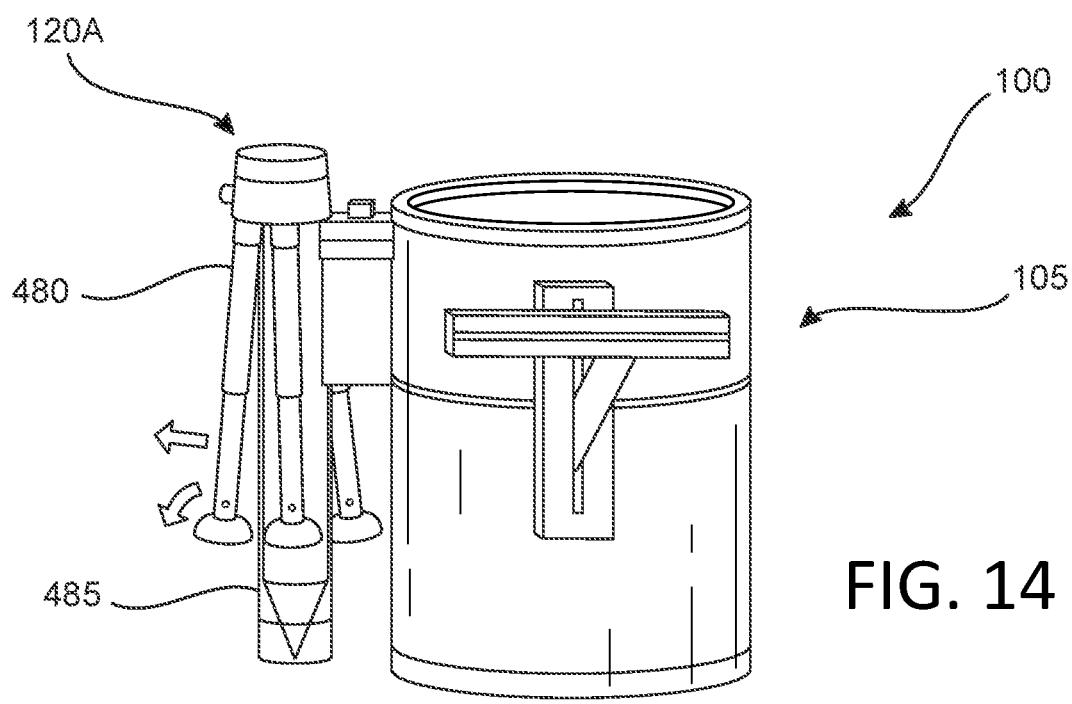
FIG. 14 is a side view of exemplary components of the exemplary system in accordance with an embodiment of the present invention.
Figure 15:
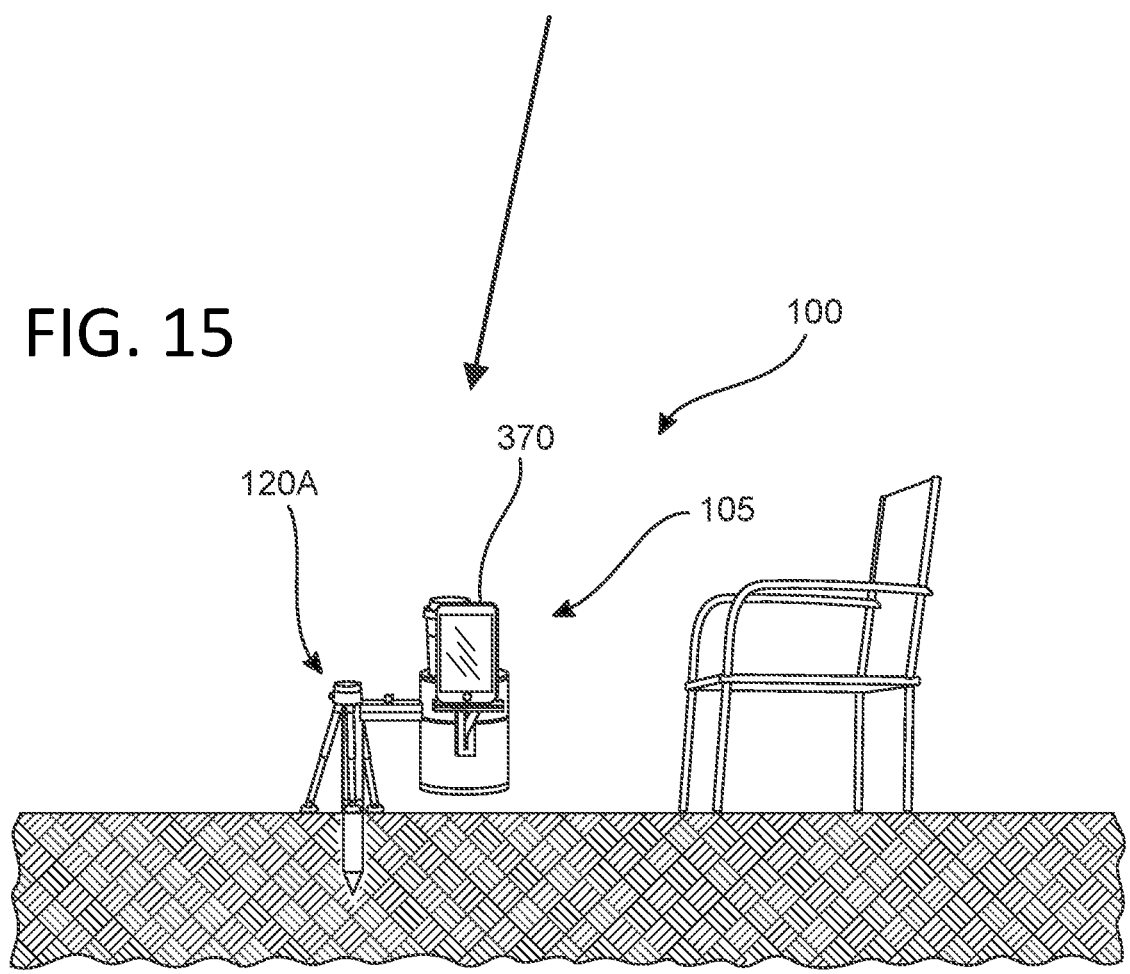
FIG. 15 is a perspective view of exemplary components of the exemplary system in accordance with an embodiment of the present invention.

FIGS. 14 and 15 illustrate an attachment assembly 120A that may be removably attached to assembly 105 similarly to attachment assembly 120. Attachment assembly 120A may include a fastener 485 (e.g., pointed anchor) that may be selectively ejected from a cavity of attachment assembly 120A to be driven into a substrate such as the ground (e.g., grass, beach sand, or another suitable surface). Attachment assembly 120A may be further supported via a plurality of members 480. Members 480 may also include fasteners (e.g., pointed members) that may provide further fastening of attachment assembly 120A to a surface substrate.

Figure 16:
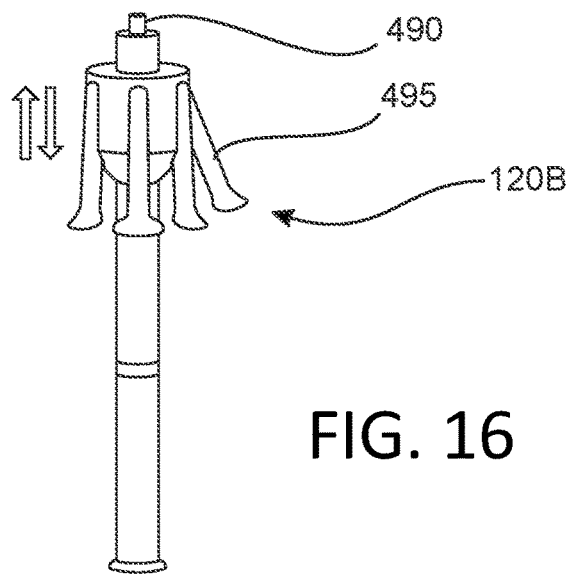
FIG. 16 is a side view of exemplary components of the exemplary system in accordance with an embodiment of the present invention.
Figure 17:
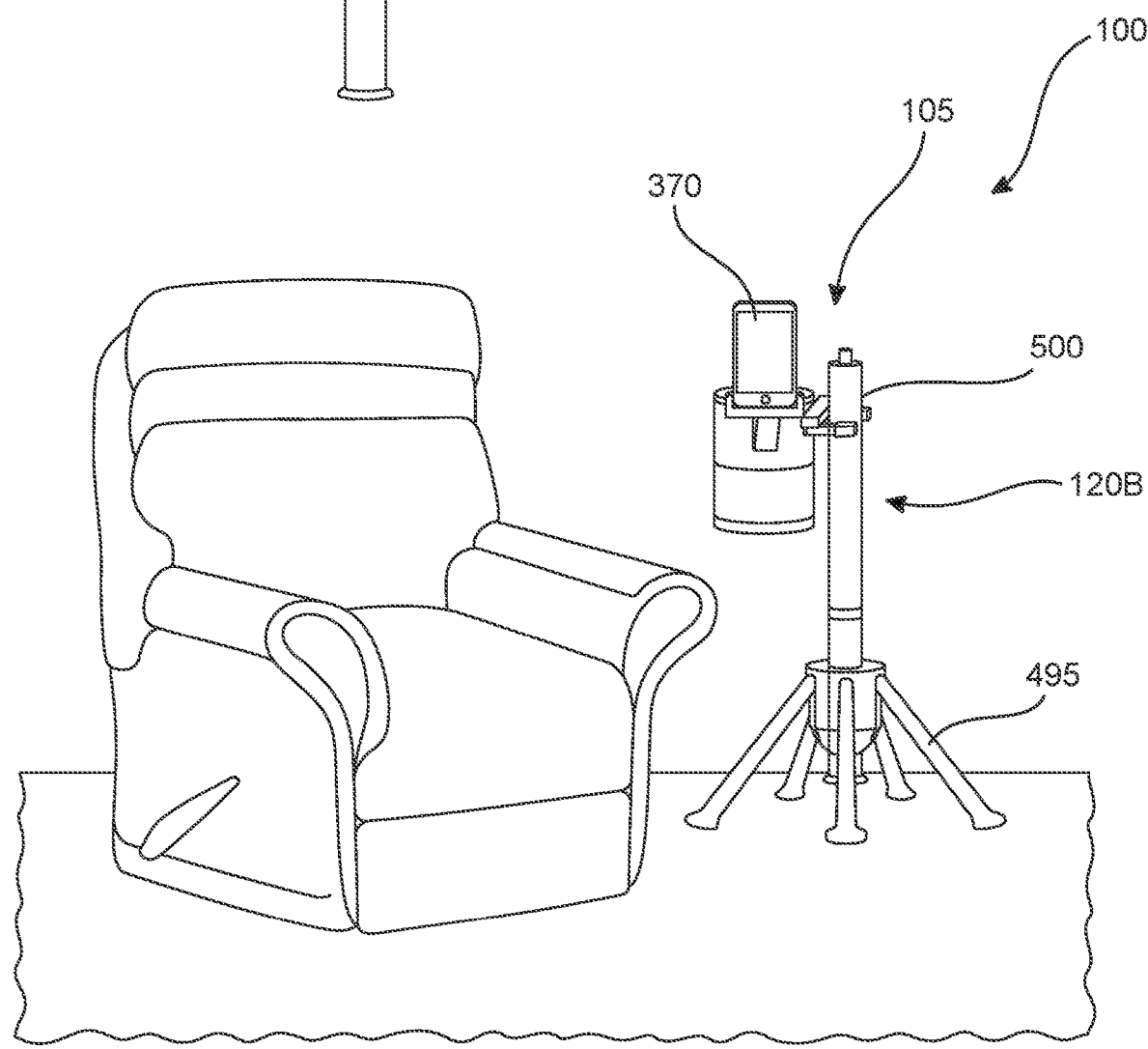
FIG. 17 is a perspective view of exemplary components of the exemplary system in accordance with an embodiment of the present invention.

FIGS. 16 and 17 illustrate an attachment assembly 120B that may be removably attached to assembly 105 similarly to attachment assembly 120. Attachment assembly 120B may be an adapter for use in residences (e.g., a home/patio adapter that may be a foldable stand). Attachment assembly 120B may include a release actuator 490 that may be a button that releases the adapter's members 495 (e.g., three or four legs) that slide up and down and lock for easy placement on a desired surface. Attachment assembly 120B may include an anchor assembly 500 to which assembly 105 may be removably attached.

Figure 18:
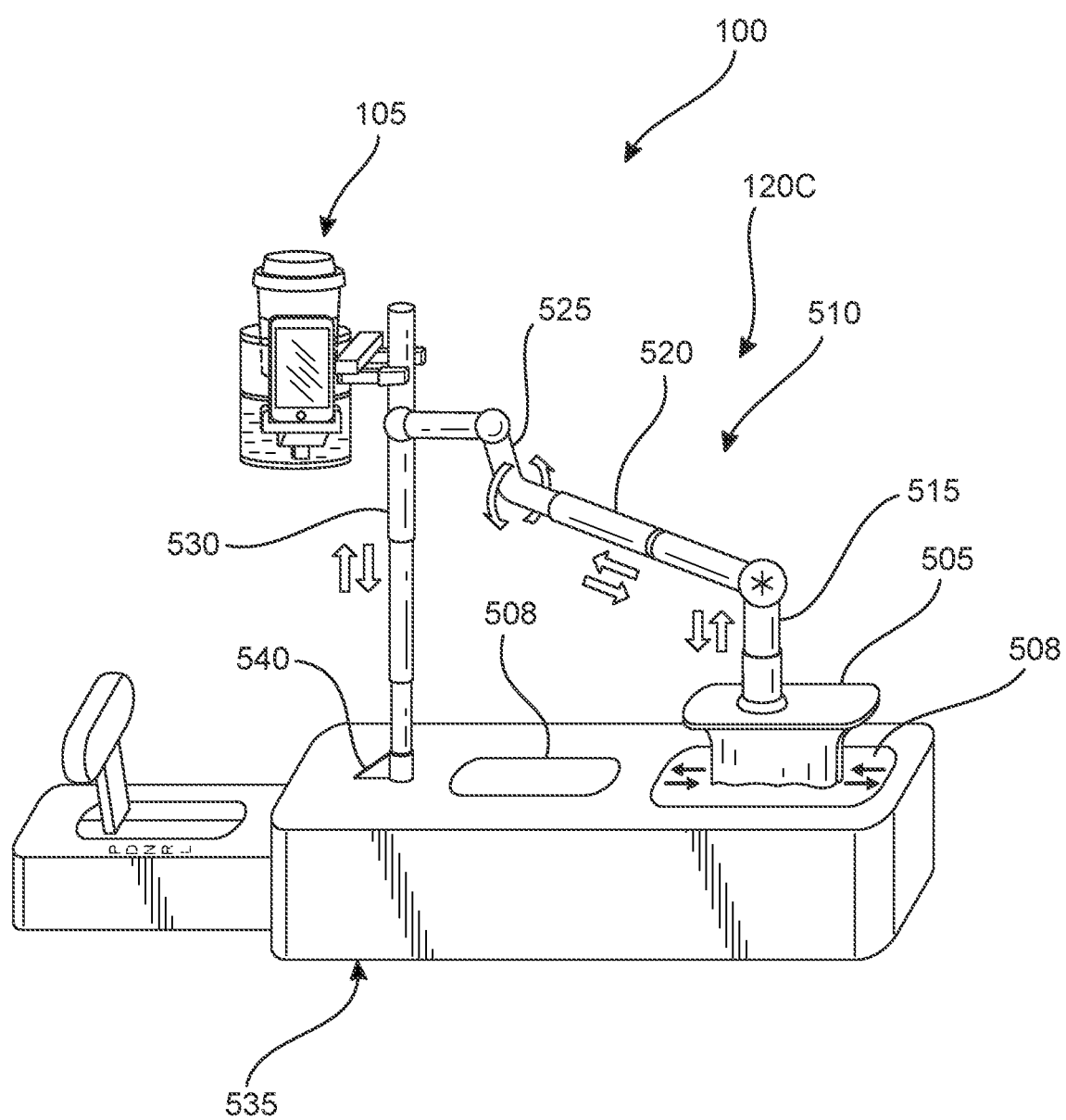
FIG. 18 is a perspective view of exemplary components of the exemplary system in accordance with an embodiment of the present invention.

FIG. 18 illustrates an attachment assembly 120C that may be removably attached to assembly 105 similarly to attachment assembly 120. Attachment assembly 120C may be an automobile adapter that may mount to any suitable vehicle cup holder 508 and may include flexible joints. Attachment assembly 120C may include an initial mounting mechanism 505 that may be removably received in vehicle cup holder 508 and an adjustable assembly 510 including a plurality of adjustable joints and/or extendable members. Adjustable assembly 510 may include a first adjustable joint 515. Adjustable assembly 510 may also include an extendable member 520 (e.g., an initial adapter pole). Adjustable assembly 510 may also include a rotatable joint 525 that may rotate attachment assembly 120C from between 0 to 180 degrees. Adjustable assembly 510 may also include an adjustable strut 530 (e.g., pole) that may mount assembly 105 to a surface of a vehicle component 535 (e.g., to a surface of a center automobile console) via an adjustable bottom portion 540 of strut 530 (e.g., which may adjust to any suitable surface to which attachment assembly 120C is mounted).

Figure 19A:
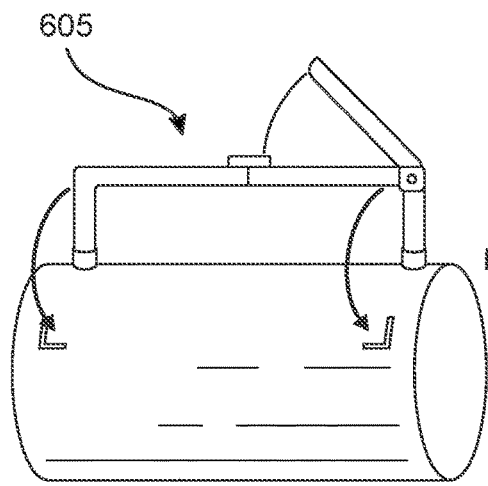
FIG. 19A is a perspective view of exemplary components of another exemplary system in accordance with an embodiment of the present invention.
Figure 19B:
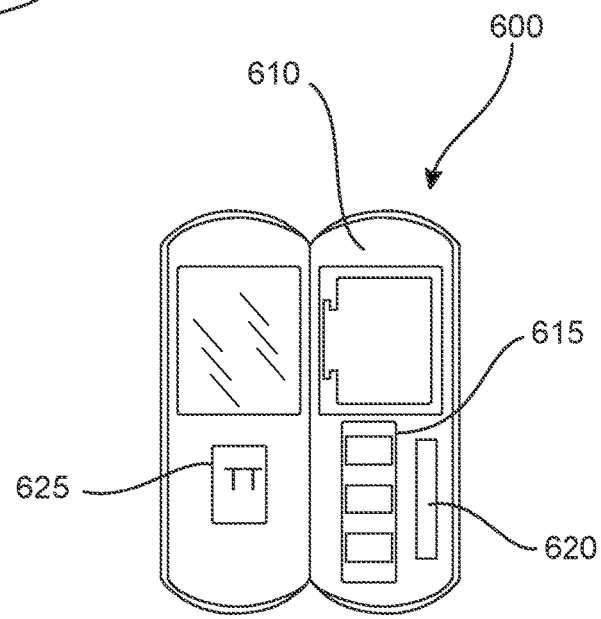
FIG. 19B is a perspective view of exemplary components of another exemplary system in accordance with an embodiment of the present invention.
Figure 19C:
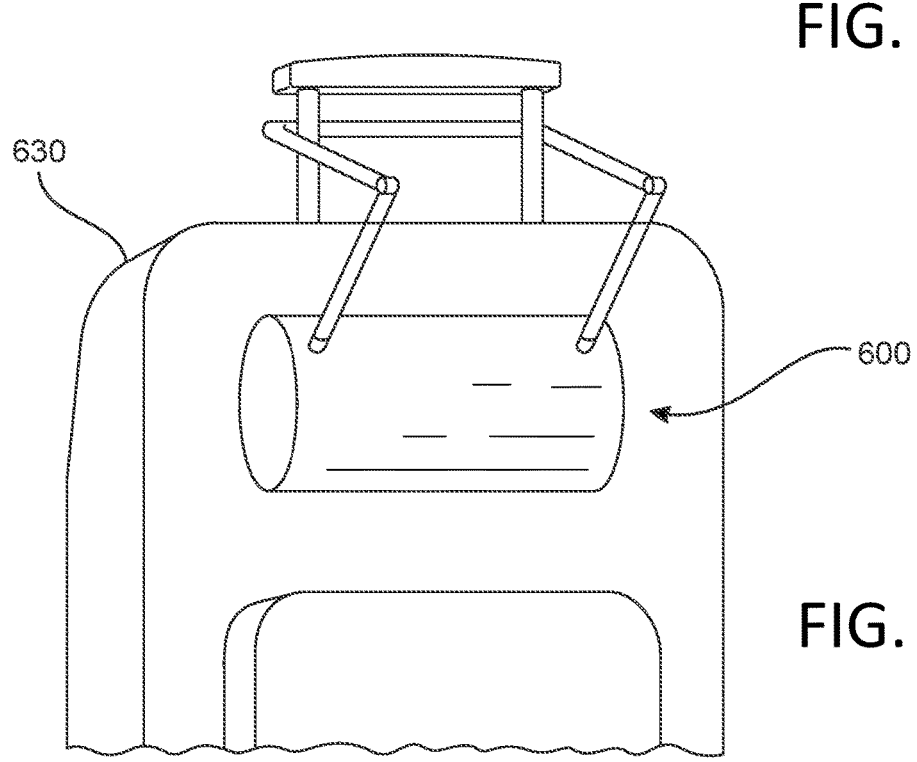
FIG. 19C is a perspective view of exemplary components of another exemplary system in accordance with an embodiment of the present invention.

FIGS. 19A, 19B, and 19C illustrate an adapter assembly 600 (e.g., travel adapter assembly) that may be used with system 100. Adapter assembly 600 may include a latch assembly 605 that may open and close via a lever switch and may fold (e.g., be collapsible) for storage. Adapter assembly 600 may also include a plurality of compartments 610, 615, 620, and 625 that may be configured to receive and store (e.g., during travel) assembly 105 and associated accessories (e.g., charger and charging cable, foreign travel adapters, and any other desired accessories). FIG. 19A illustrates adapter assembly 600 in a closed state, FIG. 19B illustrates assembly 600 in an open state, and FIG. 19C illustrates adapter assembly 600 attached to luggage 630.

Figure 20A:
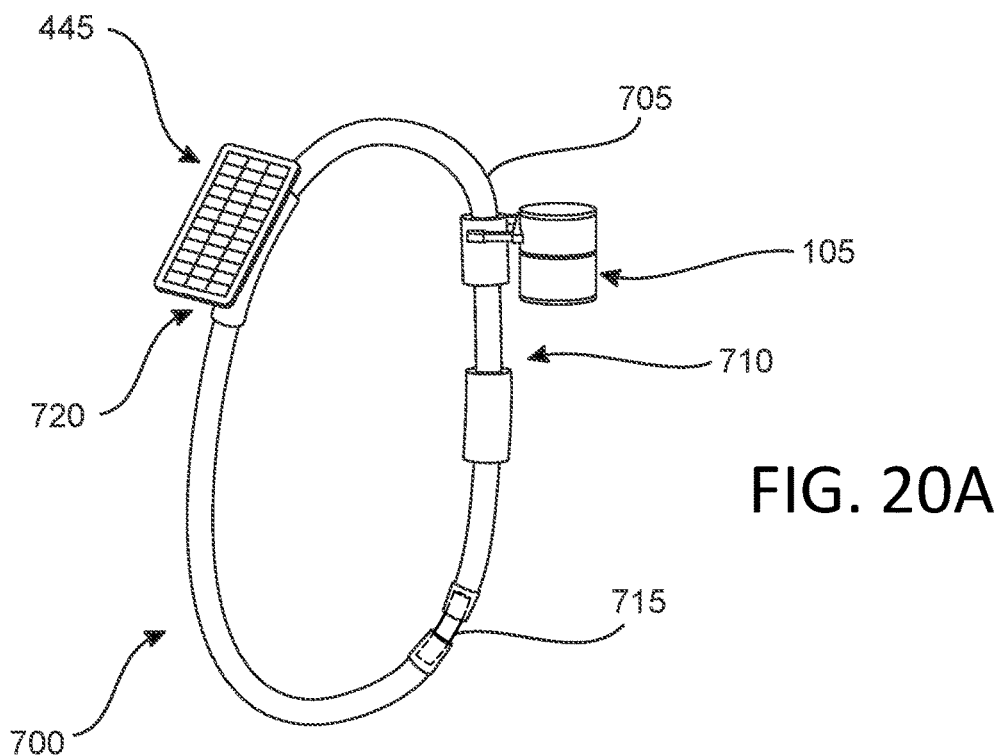
FIG. 20A is a perspective view of exemplary components of another exemplary system in accordance with an embodiment of the present invention.
Figure 20B:
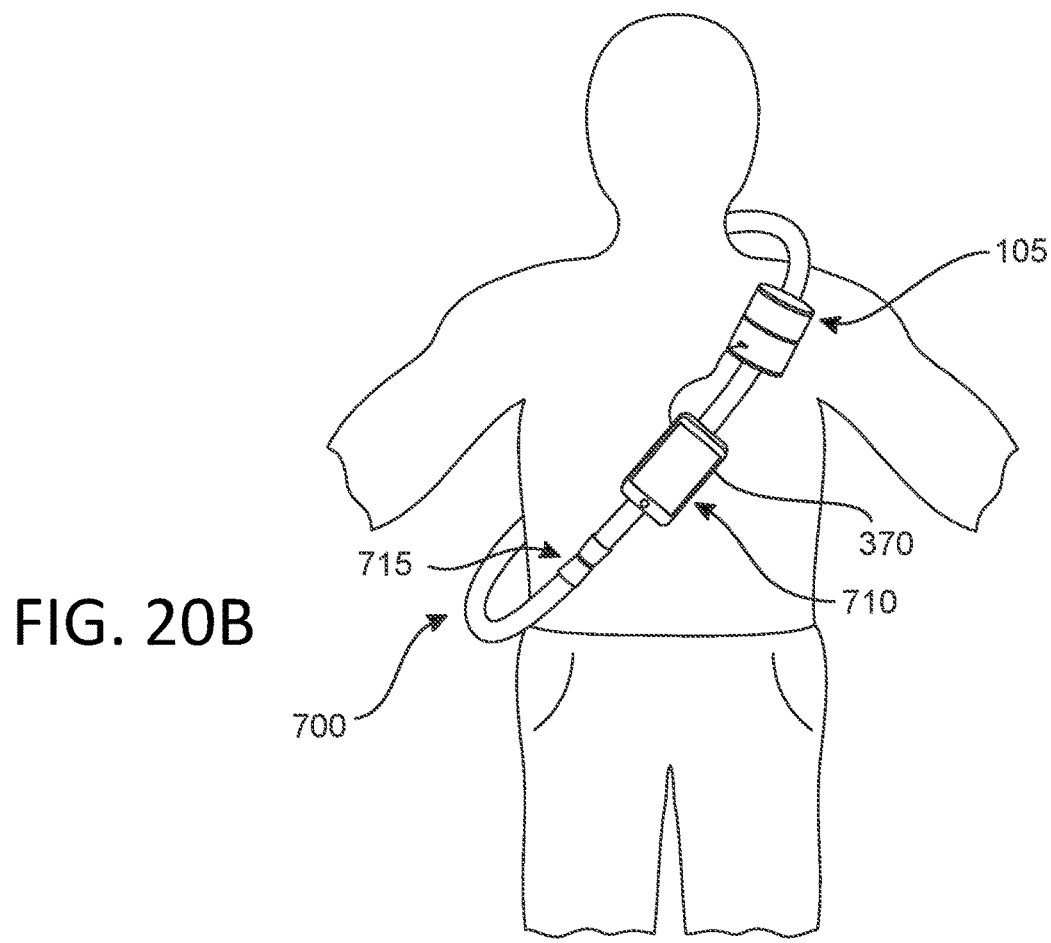
FIG. 20B is a perspective view of exemplary components of another exemplary system in accordance with an embodiment of the present invention.

FIGS. 20A and 20B illustrates an adapter assembly 700 (e.g., sling or carry adapter assembly) that may be used with system 100. Adapter assembly 700 may include an attachment member 705 to which assembly 105 may be removably attachable. Adapter assembly 700 may also include an attachment member 710 to which device 370 (e.g., a smart phone) may be removably attachable. Adapter assembly 700 may further include a locking and expanding mechanism 715 that may adjust tension and slack of adapter assembly 700 on a user's body. Adapter assembly 700 may also include an attachment assembly 720 to which attachment device 445 (e.g., including solar panels) may be attached and from which power may be supplied from attachment device 445 to power storage 280. Assembly 105 may be electrically connected to some or all of a user's devices attached to adapter assembly 700 and/or located near a user wearing adapter assembly 700.

The exemplary disclosed device and method may be used in any suitable application involving electrically charging electronic devices. Also, the exemplary disclosed device and method may be used in any suitable application for positioning user devices during use. For example, the exemplary disclosed device and method may be used in any application for attaching electronic devices to objects during charging and/or use of the electronic devices. The exemplary disclosed device and method may also be used in any suitable application for maintaining a desired position of a user device (e.g., a hands-free position) during use.

An exemplary operation of system 100 will now be described. A user may turn on integrated systems (e.g., exemplary disclosed speakers) of system 100 as described for example above. The user may also attach any desired accessories to assembly 105 as described for example above.

The user may attach assembly 105 to a desired object (e.g., object 360 or object 385) via attachment assembly 120 as described for example above. The user may attach an exemplary disclosed user device (e.g., device 370) to device stand assembly 220 and/or electrically attach the user device to a power outlet (e.g., power outlet 222, 350, or 355) of assembly 105 at any desired time during use of system 100.

Anchor assembly 150 of attachment assembly 120 may be rotated relative to base assembly 145 (e.g., or base assembly 145 may be rotated relative to anchor assembly 150) about axis X so that assembly 105 is positioned as desired. Movable assembly 115 may also be rotated relative to body assembly 110 (e.g., and attachment assembly 120) about axis Z so that assembly 105 is positioned as desired. Device stand assembly 220 may also be moved (e.g., moved up and down) in a direction parallel to axis Z so that assembly 105 is positioned as desired. Device stand 265 may be rotated (e.g., tilted) toward and away from body assembly 110 so that assembly 105 is positioned as desired. The exemplary disclosed user device (e.g., device 370) attached to device stand assembly 220 may be thereby positioned in any desired position for use by the user. The user may also attach and/or adjust the exemplary disclosed accessories to assembly 105 as described above.

In at least some exemplary embodiments, the exemplary disclosed apparatus may include an adjustable attachment assembly (e.g., attachment assembly 120) including at least one movable member, a body assembly (e.g., body assembly 110) that is movably attached to the adjustable attachment assembly, a movable assembly (e.g., movable assembly 115) that is movably attached to the body assembly, a power storage (e.g., power storage 280) disposed in at least one of the movable assembly and the body assembly, and a device stand assembly (e.g., device stand assembly 220) movably attached to the movable assembly. The adjustable attachment assembly may be movable in a first direction relative to the body assembly. The movable assembly may be movable in a second direction relative to the body assembly that is different from the first direction. The body assembly may be rotatably attached to the adjustable attachment assembly about a first axis, and the movable assembly may be rotatably attached to the body assembly about a second axis. The first axis may be perpendicular to the second axis. The device stand assembly may be movable vertically relative to the movable assembly in a third direction that is parallel to the second direction. The device stand assembly may be locked and unlocked for movement in the third direction based on a vertical movement release actuator disposed on the device stand assembly being actuated. The device stand assembly may be rotatable toward and away from the movable assembly and the body assembly. The device stand assembly may be locked and unlocked for rotation toward and away from the body assembly based on a tilt release actuator disposed on the device stand assembly being actuated. Both the adjustable attachment assembly and the device stand assembly may be collapsible between an extended position and a collapsed position. The at least one movable member may be movable based on an actuation of a first release actuator disposed on the adjustable attachment assembly, and the adjustable attachment assembly may be locked and unlocked for movement based on an actuation of a second release actuator disposed on the adjustable attachment assembly. The body assembly may be a cup holder. The apparatus may further include a book holder assembly having a protruding member that is rotatably received in an aperture of the adjustable attachment assembly or the body assembly, the book holder assembly rotatable about an axis that is parallel to the second direction.

In at least some exemplary embodiments, the exemplary disclosed method may include rotatably attaching a body assembly (e.g., body assembly 110) to an adjustable attachment assembly (e.g., attachment assembly 120), rotatably attaching a movable assembly (e.g., movable assembly 115) to the body assembly, removably attaching the adjustable attachment assembly to an object, movably attaching a device stand assembly (e.g., device stand assembly 220) to the movable assembly, rotating the body assembly, the movable assembly, and the device stand assembly about a first axis relative to the attachment assembly, rotating the movable assembly and the device stand assembly about a second axis relative to the body assembly, the second axis being unparallel to the first axis, moving the device stand assembly relative to the movable assembly and the body assembly, disposing a user device on the device stand assembly, and charging the user device using a power storage (e.g., power storage 280) disposed in at least one of the movable assembly and the body assembly. The method may also include moving the device stand assembly relative to the movable assembly along an axis that is parallel to the second axis, and rotating the device stand assembly toward and away from the movable assembly and the body assembly. The second axis may be perpendicular to the first axis. The method may also include removably attaching a book holder to the adjustable attachment assembly or the body assembly, and rotating the book holder assembly about an axis that is parallel to the second axis.

In at least some exemplary embodiments, the exemplary disclosed apparatus may include an adjustable attachment assembly (e.g., attachment assembly 120) including at least one movable member, a body assembly (e.g., body assembly 110) that is rotatably attached to the adjustable attachment assembly, a movable assembly (e.g., movable assembly 115) that is rotatably attached to the body assembly, a power storage (e.g., power storage 280) disposed in at least one of the movable assembly and the body assembly, and a device stand assembly (e.g., device stand assembly 220) movably attached to the movable assembly. The adjustable attachment assembly may be rotatable about a first axis relative to the body assembly. The movable assembly and the device stand assembly may be rotatable about a second axis relative to the body assembly. The first axis may be perpendicular to the second axis. The device stand assembly may be movable vertically relative to the movable assembly along an axis that is parallel to the second axis, and the device stand assembly may be rotatable toward and away from the movable assembly and the body assembly. The adjustable attachment assembly may be a removably attachable adjustable attachment assembly that is selected from the group consisting of an assembly having a pointed anchor that may be extended, a foldable stand, and a vehicle assembly including a plurality of adjustable joints. The movable assembly may include a speakerphone powered by the power storage. The exemplary disclosed apparatus may further include a removably attachable device selected from the group consisting of a solar panel that charges the power storage and a lighting component that has a flexible body and is powered by the power storage.

In at least some exemplary embodiments, the exemplary disclosed apparatus, system, and method may charge a device while mounted to any surface and also house a user device on a stand that may be adjusted vertically and horizontally. The exemplary disclosed apparatus, system, and method may be formed in any desired shape and may power electronic devices that may be attached to a surface via the exemplary disclosed anchoring mechanism. The exemplary disclosed apparatus, system, and method may include an integrated beverage holder.

The exemplary disclosed apparatus, system, and method may provide an intuitively simple device and technique for charging multiple user devices. The exemplary disclosed apparatus, system, and method may also provide for hands-free use of the devices while they are being charged. The exemplary disclosed apparatus, system, and method may also provide a technique for maintaining user devices in a desired position during use without involving a flat surface or without taking up space on a flat surface located nearby the user, which may leave increased desk or table space available for use by the user and allow the user to comfortably position devices in the absence of flat surfaces. The exemplary disclosed apparatus, system, and method may also provide for a relatively wide variety of accessories to be used in conjunction with a device-charging arrangement.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not obscure the embodiments.

It will be apparent to those skilled in the art that various modifications and variations can be made to the exemplary disclosed apparatus, system, and method. Other embodiments will be apparent to those skilled in the art from consideration of the specification and practice of the exemplary disclosed apparatus, system, and method. It is intended that the specification and examples be considered as exemplary, with a true scope being indicated by the following claims.

What is claimed is:

1. An apparatus, comprising:
an adjustable attachment assembly including at least one movable member;
a body assembly that is movably attached to the adjustable attachment assembly;
a movable assembly that is movably attached to the body assembly;
a power storage disposed in at least one of the movable assembly and the body assembly; and
a device stand assembly movably attached to the movable assembly;
wherein the adjustable attachment assembly is movable in a first direction relative to the body assembly; and
wherein the movable assembly is movable in a second direction relative to the body assembly that is different from the first direction.

2. The apparatus of claim 1, wherein the body assembly is rotatably attached to the adjustable attachment assembly about a first axis, and the movable assembly is rotatably attached to the body assembly about a second axis.

3. The apparatus of claim 2, wherein the first axis is perpendicular to the second axis.

4. The apparatus of claim 1, wherein the device stand assembly is movable vertically relative to the movable assembly in a third direction that is parallel to the second direction.

5. The apparatus of claim 4, wherein the device stand assembly is locked and unlocked for movement in the third direction based on a vertical movement release actuator disposed on the device stand assembly being actuated.

6. The apparatus of claim 1, wherein the device stand assembly is rotatable toward and away from the movable assembly and the body assembly.

7. The apparatus of claim 6, wherein the device stand assembly is locked and unlocked for rotation toward and away from the body assembly based on a tilt release actuator disposed on the device stand assembly being actuated.

8. The apparatus of claim 1, wherein both the adjustable attachment assembly and the device stand assembly are collapsible between an extended position and a collapsed position.

9. The apparatus of claim 1, wherein the at least one movable member is movable based on an actuation of a first release actuator disposed on the adjustable attachment assembly, and the adjustable attachment assembly is locked and unlocked for movement based on an actuation of a second release actuator disposed on the adjustable attachment assembly.

10. The apparatus of claim 1, wherein the body assembly is a cup holder.

11. The apparatus of claim 1, further comprising a book holder assembly having a protruding member that is rotatably received in an aperture of the adjustable attachment assembly or the body assembly, the book holder assembly rotatable about an axis that is parallel to the second direction.

12. A method, comprising:
rotatably attaching a body assembly to an adjustable attachment assembly;
rotatably attaching a movable assembly to the body assembly;
removably attaching the adjustable attachment assembly to an object;
movably attaching a device stand assembly to the movable assembly;
rotating the body assembly, the movable assembly, and the device stand assembly about a first axis relative to the attachment assembly;
rotating the movable assembly and the device stand assembly about a second axis relative to the body assembly, the second axis being unparallel to the first axis;
moving the device stand assembly relative to the movable assembly and the body assembly;
disposing a user device on the device stand assembly; and
charging the user device using a power storage disposed in at least one of the movable assembly and the body assembly.

13. The method of claim 12, further comprising moving the device stand assembly relative to the movable assembly along an axis that is parallel to the second axis, and rotating the device stand assembly toward and away from the movable assembly and the body assembly.

14. The method of claim 12, wherein the second axis is perpendicular to the first axis.

15. The method of claim 12, further comprising removably attaching a book holder to the adjustable attachment assembly or the body assembly, and rotating the book holder assembly about an axis that is parallel to the second axis.

16. An apparatus, comprising:
an adjustable attachment assembly including at least one movable member;
a body assembly that is rotatably attached to the adjustable attachment assembly;
a movable assembly that is rotatably attached to the body assembly;
a power storage disposed in at least one of the movable assembly and the body assembly; and
a device stand assembly movably attached to the movable assembly;
wherein the adjustable attachment assembly is rotatable about a first axis relative to the body assembly; and
wherein the movable assembly and the device stand assembly are rotatable about a second axis relative to the body assembly;
wherein the first axis is perpendicular to the second axis.

17. The apparatus of claim 16, wherein the device stand assembly is movable vertically relative to the movable assembly along an axis that is parallel to the second axis, and the device stand assembly is rotatable toward and away from the movable assembly and the body assembly.

18. The apparatus of claim 16, wherein the adjustable attachment assembly is a removably attachable adjustable attachment assembly that is selected from the group consisting of an assembly having a pointed anchor that may be extended, a foldable stand, and a vehicle assembly including a plurality of adjustable joints.

19. The apparatus of claim 16, wherein the movable assembly includes a speakerphone powered by the power storage.

20. The apparatus of claim 16, further comprising a removably attachable device selected from the group consisting of a solar panel that charges the power storage, and a lighting component that has a flexible body and is powered by the power storage.

* * * * *